United States Patent
Han et al.

(10) Patent No.: US 9,887,864 B1
(45) Date of Patent: Feb. 6, 2018

(54) METHODS, DEVICES AND SYSTEMS OF HETEROGENEOUS TIME-REVERSAL PARADIGM ENABLING DIRECT CONNECTIVITY IN INTERNET OF THINGS

(71) Applicant: Origin Wireless, Inc., Greenbelt, MD (US)

(72) Inventors: Yi Han, Greenbelt, MD (US); Yan Chen, ChengDu (CN); Beibei Wang, Clarksville, MD (US); K. J. Ray Liu, Potomac, MD (US)

(73) Assignee: Origin Wireless, Inc., Greenbelt, MD (US)

( * ) Notice: Subject to any disclaimer, the term of this patent is extended or adjusted under 35 U.S.C. 154(b) by 0 days.

(21) Appl. No.: 15/268,477

(22) Filed: Sep. 16, 2016

Related U.S. Application Data

(63) Continuation-in-part of application No. 15/200,429, filed on Jul. 1, 2016, now Pat. No. 9,781,700, which
(Continued)

(51) Int. Cl.
*H04W 72/04* (2009.01)
*H04L 27/10* (2006.01)
(Continued)

(52) U.S. Cl.
CPC ............ *H04L 27/10* (2013.01); *H04L 1/0002* (2013.01); *H04L 25/03* (2013.01); *H04W 4/005* (2013.01);
(Continued)

(58) Field of Classification Search
CPC ....... H04L 27/10; H04L 1/0002; H04L 25/03; H04W 4/005; H04W 64/003;
(Continued)

(56) References Cited

U.S. PATENT DOCUMENTS 2,933,702 A   4/1960   Bogert
3,767,855 A   10/1973  Ueno et al.
(Continued)

FOREIGN PATENT DOCUMENTS

EP    2 571 214 A1    11/2012
WO    WO 2007/031088    3/2007
(Continued)

OTHER PUBLICATIONS

U.S. Appl. No. 13/706,342, filed Dec. 5, 2012, Yang et al.
(Continued)

*Primary Examiner* — Afsar M Qureshi
(74) *Attorney, Agent, or Firm* — Fish & Richardson P.C.

(57) ABSTRACT

A method of connecting heterogeneous devices to a network is provided. The method includes providing base stations connected to a network, and at each of the base stations, receiving probe signals from terminal devices working on different frequency bands. For each of the terminal devices, the base station calculates a signature waveform based on a time-reversed waveform of a channel response signal derived from the corresponding probe signal. For each of the terminal devices, the base station determines a downlink transmit signal for the terminal device based on the downlink data and the corresponding signature waveform, and transmits the downlink signals to the heterogeneous terminal devices using a single radio-frequency front-end. Besides supporting heterogeneous terminal devices simultaneously, the heterogeneous time-reversal system has features such as asymmetric complexity architecture, which is better for the low-complexity and energy-efficiency requirements of terminal devices in the Internet of Things.

20 Claims, 18 Drawing Sheets

Related U.S. Application Data is a continuation of application No. 14/943,648, filed on Nov. 17, 2015, now Pat. No. 9,402,245, which is a continuation of application No. 14/202,651, filed on Mar. 10, 2014, now Pat. No. 9,226,304.

(60) Provisional application No. 62/219,315, filed on Sep. 16, 2015.

(51) Int. Cl.
    *H04W 4/00*     (2009.01)
    *H04W 64/00*     (2009.01)
    *H04L 25/03*     (2006.01)
    *H04L 1/00*     (2006.01)
    *H04W 72/00*     (2009.01)

(52) U.S. Cl.
    CPC ....... *H04W 64/003* (2013.01); *H04W 72/005* (2013.01)

(58) Field of Classification Search
    CPC .. H04W 72/005; H04W 72/0406; H04B 1/38; H04B 1/7103; H04B 1/71075; H04B 1/7163
    USPC .......................................... 370/252, 329–331
    See application file for complete search history.

(56) References Cited

U.S. PATENT DOCUMENTS

| | | | |
|---|---|---|---|
| 5,092,336 A | | 3/1992 | Fink |
| 5,155,742 A | | 10/1992 | Ariyavisitakul et al. |
| 5,428,999 A | | 7/1995 | Fink |
| 5,926,768 A | | 7/1999 | Lewiner et al. |
| 6,137,788 A | * | 10/2000 | Sawahashi ......... H04B 1/71075 370/342 |
| 6,301,291 B1 | | 10/2001 | Rouphael et al. |
| 6,490,469 B2 | | 12/2002 | Candy |
| 6,862,326 B1 | | 3/2005 | Eran et al. |
| 7,362,815 B2 | | 4/2008 | Lindskog et al. |
| 7,440,766 B1 | | 10/2008 | Tuovinen et al. |
| 7,460,605 B2 | | 12/2008 | Candy et al. |
| 7,463,690 B2 | | 12/2008 | Candy et al. |
| 7,587,291 B1 | | 9/2009 | Sarvazyan et al. |
| 7,768,876 B2 | | 8/2010 | Dahl et al. |
| 8,195,112 B1 | | 6/2012 | Zhang et al. |
| 8,346,197 B2 | | 1/2013 | Huy et al. |
| 8,411,765 B2 | | 4/2013 | Smith et al. |
| 8,451,181 B2 | | 5/2013 | Huy et al. |
| 8,457,217 B2 | | 6/2013 | Huy et al. |
| 8,498,658 B2 | | 7/2013 | Smith et al. |
| 8,593,998 B2 | | 11/2013 | Huy et al. |
| 8,743,976 B2 | | 6/2014 | Smith et al. |
| 8,792,398 B2 | | 7/2014 | Huy et al. |
| 8,831,164 B2 | | 9/2014 | Lu |
| 9,226,304 B2 | * | 12/2015 | Chen .................. H04W 72/085 |
| 9,313,020 B2 | | 4/2016 | Ma et al. |
| 9,402,245 B2 | * | 7/2016 | Chen .................. H04W 72/085 |
| 9,407,306 B2 | * | 8/2016 | Yang ........................ H04B 1/38 |
| 9,559,874 B2 | | 1/2017 | Han et al. |
| 2003/0138053 A1 | | 7/2003 | Candy et al. |
| 2004/0156443 A1 | | 8/2004 | Dent |
| 2006/0098746 A1 | | 5/2006 | Candy et al. |
| 2006/0115031 A1 | | 6/2006 | Lindskog et al. |
| 2006/0193410 A1 | * | 8/2006 | Moorti .................. H04W 52/52 375/347 |
| 2006/0233221 A1 | | 10/2006 | Xu |
| 2009/0296786 A1 | * | 12/2009 | Massicotte ........... H04B 1/7103 375/148 |
| 2010/0302977 A1 | | 12/2010 | Huy et al. |
| 2010/0309829 A1 | | 12/2010 | Huy et al. |
| 2012/0155515 A1 | | 6/2012 | Smith et al. |
| 2012/0183037 A1 | | 7/2012 | Allpress et al. |
| 2012/0207234 A1 | | 8/2012 | De Rosny et al. |
| 2012/0257660 A1 | | 10/2012 | Smith et al. |
| 2012/0263056 A1 | | 10/2012 | Smith et al. |
| 2012/0328037 A1 | | 12/2012 | Hsu et al. |
| 2013/0201958 A1 | * | 8/2013 | Phan Huy ............ H04B 7/0413 370/329 |
| 2013/0223503 A1 | | 8/2013 | Smith et al. |
| 2014/0022128 A1 | | 1/2014 | Smith |
| 2014/0126567 A1 | | 5/2014 | Husain et al. |
| 2014/0185596 A1 | * | 7/2014 | Han ..................... H04B 1/7163 370/337 |
| 2015/0049745 A1 | | 2/2015 | Han et al. |
| 2015/0049792 A1 | * | 2/2015 | Han .................. H04L 25/03012 375/219 |
| 2015/0130957 A1 | * | 5/2015 | Berelejis ................. H04L 67/12 348/211.1 |
| 2015/0201402 A1 | * | 7/2015 | Morioka ............. H04W 72/042 370/329 |
| 2016/0018508 A1 | | 1/2016 | Chen et al. |
| 2016/0021670 A1 | | 1/2016 | Yang et al. |
| 2016/0164669 A1 | | 6/2016 | Ma et al. |
| 2016/0164767 A1 | | 6/2016 | Ma et al. |
| 2016/0205569 A1 | | 7/2016 | Han et al. |
| 2016/0315797 A1 | | 10/2016 | Yang et al. |
| 2016/0316454 A1 | | 10/2016 | Chen et al. |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |

OTHER PUBLICATIONS

U.S. Appl. No. 15/004,314, filed Jan. 22, 2016, Chen et al.
U.S. Appl. No. 15/004,335, filed Jan. 22, 2016, Chen et al.
U.S. Appl. No. 15/061,059, filed Mar. 4, 2016, Ma et al.
Ashton, K., "That internet of things thing," RFiD Journal, vol. 22(7):97-114, 2009.
Atzori, L., A. Iera, and G. Morabito, "The internet of things: A survey," Computer networks, vol. 54(15):2787-2805, 2010.
Barnaghi, P., W. Wang, C. Henson, and K. Taylor, "Semantics for the internet of things: early progress and back to the future," International Journal on Semantic Web and Information Systems (IJSWIS), vol. 8(1):1-21, 2012.
Bassi, A. and G. Horn, "Internet of things in 2020: A roadmap for the future," European Commission: Information Society and Media, Sep. 5, 2008.
Botterman, M., "Internet of things: an early reality of the future internet," in Workshop Report, European Commission Information Society and Media, 2009.
Chen, Y., F. Han, Y.-H. Yang, H. Ma, Y. Han, C. Jiang, H.-Q. Lai, D. Claffey, Z. Safar, and K. R. Liu, "Time-reversal wireless paradigm for green internet of things: An overview," IEEE Internet of Things Journal, vol. 1(1):81-98, 2014.
Daniels, R. and R. Heath, "Improving on time reversal with miso precoding," in Proceedings of the Eighth International Symposium on Wireless Personal Communications Conference, 2005, pp. 18-22.
De Poorter, E., I. Moerman, and P. Demeester, "Enabling direct connectivity between heterogeneous objects in the internet of things through a network-service-oriented architecture," EURASIP Journal on Wireless Communications and Networking, vol. 2011(1):1-14, 2011.
Dohr, A., R. Modre-Opsrian, M. Drobics, D. Hayn, and G. Schreier, "The internet of things for ambient assisted living," in Information Technology: New Generations (ITNG), 2010 Seventh International Conference on. IEEE, 2010, pp. 804-809.
Dunkels, A. and J. Vasseur, "Ip for smart objects, internet protocol for smart objects (ipso) alliance", white paper# 1, Sep. 2008.
Emami, M., M. Vu, J. Hansen, A. J. Paulraj, and G. Papanicolaou, "Matched filtering with rate back-off for low complexity communications in very large delay spread channels," in Signals, Systems

(56) References Cited

OTHER PUBLICATIONS and Computers, 2004. Conference Record of the Thirty-Eighth Asilomar Conference on Signals, Systems and Computers. IEEE, vol. 1:218-222, 2004.

Gubbi, J., R. Buyya, S. Marusic, and M. Palaniswami, "Internet of things (iot): A vision, architectural elements, and future directions," Future Generation Computer Systems, vol. 29(7): 1645-1660, 2013.

Han, F., Y.-H. Yang, B. Wang, Y. Wu, and K. R. Liu, "Time-reversal division multiple access over multi-path channels," Communications, IEEE Transactions on Communications, vol. 60(7):1953-1965, 2012.

Hui, J., D. Culler, and S. Chakrabarti, "6LoWPAN: Incorporating IEEE 802.15. 4 into the IP Architecture," Internet Protocol for Smart Objects (IPSO) Alliance, White Paper #3, Jan. 2009.

Kotis, K. and A. Katasonov, "Semantic interoperability on the web of things: The semantic smart gateway framework," in Complex, Intelligent and Software Intensive Systems (CISIS), 2012 Sixth International Conference on. IEEE, pp. 630-635, 2012.

Miorandi, D., S. Sicari, F. De Pellegrini, and I. Chlamtac, "Internet of things: Vision, applications and research challenges," Ad Hoc Networks, vol. 10(7):1497-1516, 2012.

National Intelligence Council, "Disruptive Civil Technologies—Six Technologies with Potential Impacts on US Interests Out to 2025"— Conference Report CR 2008-07, http://www.dni.gov/nic/NIC home. html, 2008.

Roussos, G. and V. Kostakos, "RFID in Pervasive Computing: State-of-the-art and Outlook," Pervasive and Mobile Computing, vol. 5(1):110-131, 2009.

Song, Z., A. Cardenas, R. Masuoka et al., "Semantic middleware for the internet of things," in Internet of Things (IOT), 2010. IEEE, 2010, pp. 1-8.

Su, X., J. Riekki, J. K. Nurminen, J. Nieminen, and M. Koskimies, "Adding semantics to internet of things," Concurrency and Computation: Practice and Experience, vol. 27(8):1844-1860, 2015.

Sundmaeker, H., P. Guillemin, P. Friess, and S. Woelffl'e, "Vision and challenges for realising the Internet of Things," 2010.

Toma, I., E. Simperl, and G. Hench, "A joint roadmap for semantic technologies and the internet of things," in Proceedings of the Third STI Roadmapping Workshop, Crete, Greece, vol. 1, 2009.

Wang, B., Y. Wu, F. Han, Y.-H. Yang, and K. J. R. Liu, "Green wireless communications: a time-reversal paradigm," Selected Areas in Communications, IEEE Journal on Selected Areas in Communications, vol. 29(8):1698-1710, 2011.

Wang, W., S. De, G. Cassar, and K. Moessner, "Knowledge representation in the internet of things: semantic modelling and its applications," Automatika—Journal for Control, Measurement, Electronics, Computing and Communications, vol. 54(4), 2013.

Yang, Y.-H., B. Wang, W. S. Lin, and K. J. R. Liu, "Near-optimal waveform design for sum rate optimization in time-reversal multiuser downlink systems," IEEE Transactions on Wireless Communications, vol. 12(1):346-357, 2013.

Zorzi, M., A. Gluhak, S. Lange, and A. Bassi, "From today's intranet of things to a future internet of things: a wireless-and mobility-related view," Wireless Communications, IEEE, vol. 17(6) 44-51, 2010.

Abbasi-Moghadam, D. et al., "A SIMO one-bit time reversal for UWB communication systems", EURASIP J. Wireless Comm. and Networking, 2012:113, 2012.

Albert, D. G. et al., "Time Reversal processing for source location in an urban environment (L)", J. Acoust. Soc. Am., vol. 118(2):616-619, Aug. 2005.

Blysev, A. P. et al., "Wave phase conjugation in ultrasonic beams", Physics-Uspekhi, vol. 41(8):793-805, 1998.

Chang, Y.-H. et al., "Ultrawideband Transceiver Design Using Channel Phase Precoding", IEEE Trans. Sig. Proc., vol. 55(7):3807-3822, Jul. 2007.

Chen, Y. et al., "Time-reversal wideband communications," IEEE Signal Processing Letters, vol. 20(12):1219-1222, Dec. 2013.

Chen, Y. et al., "Time-Reversal Wireless Paradigm for Green Internet of Things: An Overview", IEEE Internet of Things Journal, vol. 1(1):81-98, Feb. 2014.

Daniels, R.C. et al., "Improving on Time-reversal with MISO Precoding," Proceedings of the Eighth International Symposium on Wireless Personal Communications Conference, Aalborg, Denmark, 5 pages, Sep. 18-22, 2005.

Daniels, R.C. et al., "MISO Precoding for Temporal and Spatial Focusing" in the Proceedings of the Eighth International Symposium on Wireless Personal Communications Conference, Aalborg, Denmark, 6 pages, Sep. 18-22, 2005.

de Rosny, J. et al., "Theory of Electromagnetic Time-Reversal Minors", IEEE Trans. Antennas Propag., vol. 58(10):3139-3149, Oct. 2010.

Derode, A. et al., "Ultrasonic pulse compression with one-bit time reversal through multiple scattering", J. Appl. Phys., vol. 85(9):6343-6352, May 1999.

Derode, A. et al., "Taking Advantage of Multiple Scattering to Communicate with Time-Reversal Antennas", Phys. Rev. Lett., vol. 90(1): 014301-1-4, Jan. 2003.

Derode, A. et al., "Robust Acoustic Time Reversal and High-Order Multiple Scattering", Phys. Rev. Lett., vol. 75(23):4206-4210, Dec. 1995.

Divsalar, D. and Simon, M. K., "Improved CDMA performance using parallel interference cancellation", JPL Publication, 95-21, Oct. 1995.

Divsalar, D., Simon, M. K, Raphaeli, Dan, "Improved Parallel Interference Cancellation for CDMA", IEEE Transactions on Communications, vol. 46, No. 2, Feb. 1998.

Donne, C. et al., "Focusing in transmit-receive mode through inhomogeneous media: The time reversal matched filter approach", J. Acoust. Soc. Am., vol. 98(2):1155-1162, Pt. 1, Aug. 1995.

Duel-Hallen, A., Holtzman, J., and Zvonar, Z., "Multiuser detection for CDMA systems", IEEE Personal Communications, pp. 46-58, Apr. 1995.

Edelmann, G.F. et al., "An Initial Demonstration of Underwater Acoustic Communication Using Time Reversal", IEEE Journal of Oceanic Engineering, vol. 27(3):602-609, Jul. 2002.

Emami, M. et al., "Matched Filtering with Rate Back-off for Low Complexity Communications in Very Large Delay Spread Channels," 38th Asilomar Conference on Signals, Systems and Computers, pp. 218-222, 2004.

Fink, M. et al., "Acoustic Time-Reversal Mirrors", Inverse Problems, vol. 17:R1-R38, 2001.

Fink, M., "Time Reversal of Ultrasonic Fields—Part I: Basic Principals", IEEE Trans. Ultrasonics, Ferroelectrics and Freq. Contr., vol. 39(5):555-566, Sep. 1992.

Fink, M., "Time-Reversal Mirrors", J. Phys. D: Appl. Phys., vol. 26:1333-1350, 1993.

Fink, M., "Time-Reversed Acoustics", Scientific American, pp. 91-97, Nov. 1999.

Fink, M. et al., "Self focusing in inhomogeneous media with time reversal acoustic mirrors," IEEE Ultrasonics Symposium, vol. 1:681-686, 1989.

Fontana, R.J. et al., "Ultra-Wideband Precision Asset Location System", Proc. of the IEEE Conf. on UWB Sys. and Tech., pp. 147-150, 2002.

Guo, N. et al., "Reduced-Complexity UWB Time-Reversal Techniques and Experimental Results", IEEE Trans. on Wireless Comm., vol. 6(12):4221-4226, Dec. 2007.

Han, F. et al., "A multiuser TRDMA uplink system with 2D parallel interference cancellation," IEEE Transactions on Communications, vol. 62(3):1011-1022, Mar. 2014.

Han, F. et al., "An Interference Cancellation Scheme for the Multiuser TRDMA Uplink System," Global Telecommunications Conference, pp. 3583-3588, 2013.

Han, F., "Energy Efficient Optimization in Green Wireless Networks", University of Maryland Ph. D. Dissertation, 2013.

Han, F., et al., "Time-reversal division multiple access in multi-path channels," Global Telecommunications Conference, pp. 1-5, Dec. 2011.

(56) References Cited

OTHER PUBLICATIONS

Han, F. et al., , "Time-reversal division multiple access over multi-path channels," IEEE Transactions on Communications, vol. 60(7):1953-1965, Jul. 2012.

Han, Y. et al., "Time-Reversal with Limited Signature Precision: Tradeoff Between Complexity and Performance", Proc. IEEE Global Conference on Signal and Information Processing (GlobalSIP), Atlanta, Dec. 2014.

Henty, B.E. and D.D. Stancil, "Multipath-Enabled Super-Resolution for RF and Microwave Communication using Phase-Conjugate Arrays", Phys. Rev. Lett., vol. 93, 243904, Dec. 2004.

Jin, Y. et al., "Time-Reversal Detection Using Antenna Arrays", IEEE Trans. Signal Processing, vol. 57(4):1396-1414, Apr. 2009.

Jin, Y. et al., "Adaptive time reversal beamforming in dense multipath communication networks," 2008 42nd Asilomar Conference on Signals, Systems and Computers, pp. 2027-2031, Oct. 2008.

Khalegi, A. et al., "Demonstration of Time-Reversal in Indoor Ultra-Wideband Communication: Time Domain Measurement", IEEE Proc. of ISWCS, pp. 465-468, 2007.

Kuperman, W.A. et al., "Phase conjugation in the ocean: Experimental demonstration of an acoustic time-reversal mina", J. Acoust. Soc. Am., vol. 103(1), pp. 25-40, Jan. 1998.

Kyritsi, P. et al., "One-bit Time Reversal for WLAN Applications", IEEE 16th Intern. Symp. on Personal, Indoor and Mobile Radio Comm., pp. 532-536, 2005.

Kyritsi, P. et al., "Time reversal and zero-forcing equalization for fixed wireless access channels," 39th Asilomar Conference on Signals, Systems and Computers, pp. 1297-1301, 2005.

Kyritsi, P. et al., "Time reversal techniques for wireless communications," IEEE Vehicular Technology Conference, vol. 1:47-51, 2004.

Lemoult, F. et al., "Manipulating Spatiotemporal Degrees of Freedom in Waves of Random Media", Phys. Rev. Lett, vol. 103, 173902, Oct. 2009.

Lemoult, F. et al., "Resonant Metalenses for Breaking the Diffraction Barrier", Phys. Rev. Lett., vol. 104, 203901, May 2010.

Lerosey, G. et al., "Time Reversal of Electromagnetic Waves and Telecommunication", Radio Science, vol. 40, RS6S12, 2005.

Lerosey, G. et al., "Time Reversal of Electromagnetic Waves", Phys. Rev. Lett., vol. 92(19), 193904, May 2004.

Lerosey, G. et al., "Time Reversal of Wideband Microwaves", Appl. Phys. Lett., vol. 88, 154101, Apr. 2006.

Lerosey, G. et al., "Focusing beyond the diffraction limit with far-field time reversal", Science, vol. 315:1120-1122, Feb. 2007.

Lienard, M. et al., "Focusing gain model of time-reversed signals in dense multipath channels," IEEE Antennas and Wireless Propagation Letters, vol. 11:1064-1067, 2012.

Ma, H. et al., "Interference-Mitigating Broadband Secondary User Downlink System: A Time-Reversal Solution", Global Telecommunications Conference, pp. 884-889, 2013.

Molisch, Andreas F. et al., "IEEE 802.15.4a channel model—final report", Tech. Rep. Document IEEE 802.15-04-0662-02-004a, 2005.

Montaldo, G. et al., "Telecommunication in a disordered environment with iterative time reversal", Waves Random Media, vol. 14:287-302, 2004.

Moshavi, S., "Multi-user detection for DS-CDMA communications", IEEE Communications Magazine, pp. 124-136, Oct. 1996.

Moura, J.M.F. and Y. Jin, "Detection by Time Reversal: Single Antenna", IEEE Trans. on Signal Process., vol. 55(1):187-201, Jan. 2007.

Moura, J.M.F. and Y. Jin, "Time Reversal Imaging by Adaptive Interference Canceling", IEEE Trans. on Signal Process., vol. 56(1):233-247, Jan. 2008.

Naqvi, I.H., et al., "Performance Enhancement of Multiuser Time Reversal UWB Communication System", Proc. of IEEE ISWCS, pp. 567-571, 2007.

Naqvi, I.H. et al., "Experimental validation of time reversal ultra wide-band communication system for high data rates", IET Microw. Antennas Propag., vol. 4 (Iss. 5):643-650, 2010.

Naqvi, I.H. et al., "Effects of Time Variant Channel on a Time Reversal UWB System", Global Telecommunications Conference, 2009.

Nguyen, H. T., "On the performance of one bit time reversal for multi-user wireless communications", IEEE Proc. of ISWCS, pp. 672-676, 2007.

Nguyen, H. et al., "Antenna Selection for Time Reversal MIMO UWB Systems", IEEE Vehicle Technology Conference, pp. 1-5, 2009.

Nguyen, H. et al. "On the MSI Mitigation for MIMO UWB Time Reversal Systems", Proc. of IEEE International Conference on Ultra-Wideband, pp. 295-299, 2009.

Nguyen, H. et al., "Preequalizer Design for Spatial Multiplexing SIMO-UWB TR Systems", IEEE Trans. on Vehicular Tech., vol. 59(8):3798-3805, Oct. 2010.

Nguyen, H.T., "Partial one bit time reversal for UWB impulse radio multi-user communications", IEEE Proc. of ICCE, 2008.

Nguyen, H.T., Kovacs, I.Z., Eggers, P.C.F., "A time reversal transmission approach for multiuser UWB communications", IEEE Trans. Antennas and Propagation, vol. 54(11):3216-3224, Nov. 2006.

Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.

Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.

Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.

Parvulescu, A. and Clay, C. S., "Reproducibility of Signal Transmissions in the Ocean", The Radio and Electronic Engineer, pp. 223-228, Apr. 1965.

Phan-Huy, D. T., S.B. Halima, M. Helard, "Frequency Division Duplex Time Reversal", Global Telecommunications Conference, (2011).

Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.

Porcino, D., "Ultra-Wideband Radio Technology: Potential and Challenges Ahead", IEEE Communications Mag., pp. 66-74, Jul. 2003.

Prada, C., F. Wu, and M. Fink, "The iterative time reversal minor: A solution to self-focusing in the pulse echo mode," J. Acoustic Society of America, vol. 90, pp. 1119-1129, 1991.

Qiu, R. C. et al., "Time reversal with miso for ultra-wideband communications: Experimental results," IEEE Antenna and Wireless Propagation Letters, vol. 5:269-273 (2006).

Rode, J. P., M.J. Hsu, D. Smith and A. Hussain, "Collaborative Beamfocusing Radio (COBRA)", Proc. of SPIE, vol. 8753, pp. 87530J-1-87530J-11, 2013.

Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.

Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.

Song, H. C., W.A. Kuperman, W.S. Hodgkiss, T. Akal, and C. Feria, "Iterative time reversal on the ocean", J. Acoust. Soc. Am, vol. 105, No. 6, pp. 3176-3184, Jun. 1999.

Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.

(56) References Cited

OTHER PUBLICATIONS

Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).

Varanasi, M. K. and Aazhang, B., "Multistage Detection in Asynchronous Code-Division Multiple-Access Communications", IEEE Transactions on Communications, vol. 38, No. 4, pp. 509-519, Apr. 1990.

Verdu, S., "Minimum probability of error for asynchronous Gaussian multiple-access channels", IEEE Trans. Inform. Theory, vol. IT-32, pp. 85-96, Jan. 1986.

Verdu, S., "Optimum multiuser asymptotic efficiency", IEEE Trans. Commun., vol. COM-34, pp. 890-897, Sep. 1986.

Viterbi, A. J., "Very low rate convolutional codes for maximum theoretical performance of spread-spectrum multiple-access channels", IEEE Transactions on Selected Areas in Communications, vol. 8, No. 4, pp. 641-649, May 1990.

Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.

Wang, B. et al., "Green wireless communications: A time-reversal paradigm," IEEE Journal of Selected Areas in Communications, vol. 29:1698-1710 (2011).

Wu, F., J.L. Thomas, and M. Fink, "Time Reversal of Ultrasonic Fields—Part II: Experimental Results", IEEE Trans. Ultrasonics, Ferroelectrics and Freq. Contr., vol. 39(5):567-578, Sep. 1992.

Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.

Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.

Yang, Y. H., "Waveform Design and Network Selection in Wideband Small Cell Networks", University of Maryland Ph. D. Thesis, 2013.

Yang, Y. H., B. Wang and K.J.R. Liu, "Waveform Design for Sum Rate Optimization in Time-Reversal Multiuser Downlink Systems", Global Telecommunications Conference, (2011).

Yang, Y.-H., Wang, B., Lin, W.S., Liu, K.J.R., "Near-Optimal Waveform Design for Sum Rate Optimization in Time-Reversal Multiuser Downlink Systems", IEEE Trans Wireless Communications, vol. 12(1):346-357, Jan. 2013.

Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.

\* cited by examiner

METHODS, DEVICES AND SYSTEMS OF HETEROGENEOUS TIME-REVERSAL PARADIGM ENABLING DIRECT CONNECTIVITY IN INTERNET OF THINGS

CROSS-REFERENCE TO RELATED APPLICATIONS

This application is a continuation-in-part of, and claims priority to, U.S. patent application Ser. No. 15/200,429, filed on Jul. 1, 2016, which is a continuation of U.S. patent application Ser. No. 14/943,648, filed on Nov. 17, 2015, now U.S. Pat. No. 9,402,245, issued on Jul. 26, 2016, which is a continuation of U.S. patent application Ser. No. 14/202,651, filed on Mar. 10, 2014 now U.S. Pat. No. 9,226,304, issued on Dec. 29, 2015. This application claims priority to U.S. provisional application 62/219,315, filed on Sep. 16, 2015, the entire contents of which are herein incorporated by reference.

TECHNICAL FIELD

This disclosure relates to heterogeneous time-reversal paradigm to enable direct connectivity in the Internet of things.

BACKGROUND

Ubiquitous RFID tags, sensors, actuators, mobile phones etc. cut across many areas of modern-day living, which offers the ability to measure, infer and understand the environmental indicators. The proliferation of these devices creates the term "Internet of Things" (IoT), wherein these devices blend seamlessly with the environment around us, and the information is shared across the whole platform. The notion "Internet of Things" dates back to 1999 when first proposed by Kevin Ashton. Even though logistic is the originally considered application, in the past decade, the coverage of Internet of Things has been extended to a wide range of applications including healthcare, utilities, transport etc. Due to its high impact on several aspects of everyday life and behavior of the potential users, Internet of Things is listed as one of the six "disruptive civil technologies" by the US National Intelligence Council.

Considering the massive number of devices and various application scenarios in Internet of Things, the devices within Internet of Things are highly heterogeneous. From the perspective of communication, one of the significant heterogeneity is the bandwidth heterogeneity and thus the corresponding radio-frequency front end. To address the bandwidth heterogeneity, various communication standards such as ZigBee, Bluetooth and Wi-Fi are adopted simultaneously in the current Internet of Things platform, which leads to a wild growth of co-located wireless communication standards. When multiple wireless communication standards are operated in the same geographical environment, the devices often suffer from harmful interference. Furthermore, the communication between devices with different communication standards is only possible by gateway nodes, resulting in the fragmentation of the whole network, hampering the objects interoperability and slowing down the development of a unified reference model for Internet of Things.

To enable the connectivity between devices with various bandwidths, some existing works build middlewares to hide the technical details of different communication standards from the application layer. Service Oriented Device Architecture (SODA) is proposed as a promising approach to integrate Service Oriented Architecture (SOA) principles into the Internet of Things. An effective SOA-based integration of Internet of Things is illustrated in enterprise service. Business Process Execution Language (BPEL) has been widely used as the process language in the middleware. However, these technologies used to realize middleware architectures are often not suitable for resource-constrained scenario due to their complexity.

SUMMARY

In general, in one aspect, a more effective approach of connecting devices with different bandwidths to a network is provided. By integrating the multirate signal processing into time-reversal technique, the proposed system is capable of supporting these heterogeneous devices with a single set of radio frequency front-end, and therefore it is a unified framework for connecting devices of heterogeneous bandwidths. The increase of complexity in the proposed system lies in the digital processing at the base station, instead of at the devices' end, which can be handled with more powerful digital signal processor. Meanwhile, the complexity of the devices stays low and therefore satisfies the low complexity and scalability requirement of Internet of Things. Since there is no middleware in the proposed scheme and the additional physical layer complexity is concentrated at the base station, the proposed heterogeneous time-reversal system better satisfies the low-complexity and energy-efficiency requirement for the devices compared with the middleware approach.

The method includes providing base stations that are connected to a network, and at each of the base stations, receiving probe signals from terminal devices with heterogeneous bandwidths that intend to communicate with the base station. The heterogeneous devices are grouped into different device types based on distinct spectrum occupation. For each of the terminal devices belonging to various device types that intends to communicate with the base station, the base station calculates a signature waveform based on a time-reversed waveform of a channel response signal derived from the corresponding probe signal and device bandwidth. For each of the terminal devices that the base station intends to transmit downlink data, the base station determines a downlink transmit signal for the terminal device based on the downlink data, the corresponding signature waveform and device types based on the spectrum occupation. The base station transmits the downlink signals to the terminal devices with heterogeneous bandwidths. Each base station has a broadcast region such that terminal devices within the broadcast region can communicate with the base station, several base stations are positioned at locations such that they have overlapping broadcast regions, several terminal devices are located within the overlapped broadcast regions, the base stations transmit the downlink signals using a same frequency band, and some downlink signals transmitted by base stations having overlapping broadcast regions also overlap in time.

Implementations of the method may include one or more of the following features. Each base station can receive each probe signal from the corresponding terminal device through multiple wireless transmission paths, and the corresponding signature waveform is dependent on the multiple wireless transmission paths and device types. Determining a downlink transmit signal for the terminal device, based on the downlink data, the corresponding signature waveform and device type, can include performing a convolution of the corresponding signature waveform and the downlink data or a modified version of the downlink data and corresponding multirate signal processing based on device type to produce the downlink transmit signal. The method can include simultaneously communicate with devices of heterogeneous bandwidths using a single radio frequency front-end. The method can include, when the number of terminal devices exceeds a maximum number of terminal devices that can be supported by existing base stations, adding another base station to communicate with the additional devices beyond the maximum number of terminal devices without modifying the frequency band used by the existing base stations for transmitting the downlink signals, in which the added base station and the existing base stations share the same frequency band for transmitting the downlink signals. The method can include, at each base station receiving a combined signal that includes uplink signals from multiple terminal devices of heterogeneous bandwidths, and determining the uplink signal from each terminal device based on the combined signal, device type and the corresponding signature waveform for the terminal device. Different terminal devices within the same device type can transmit uplink signals to the same base station using the same frequency band. Different types of terminal devices can transmit uplink signals to the same base station using their specific frequency band. These uplink signals overlap in time. Different terminal devices can transmit uplink signals to different base stations using the same frequency band, and several uplink signals can overlap in time. Transmitting the downlink signals to the terminal devices can include generating a combined downlink signal that combines the downlink signals, and transmitting the combined downlink signal to the terminal devices through multiple wireless propagation paths. The base stations can be located within at least one of a common room, a common floor of a building, a common building, a common vehicle, or a common city block. Each base station can transmit each downlink signal to a particular terminal device through multiple wireless transmission paths, and the signature waveform associated with the particular terminal device is configured such that portions of the downlink signal propagating through the multiple wireless transmission paths interfere constructively at the location of the particular terminal device so that the signal strength at the location of the particular terminal device is stronger than at other locations. The signal strength at the location of the particular terminal device can be at least 3 dB stronger than at other locations more than a half of a wavelength away. The terminal devices can include at least one of environment sensors, utility meters, electrical appliances, lighting devices, audio-video devices, cameras, phones, climate control systems, power generators, timing devices, plant care devices, clothing, food containers, beacons, components in assembly lines, vehicles, or robots.

In general, in another aspect, a heterogeneous wireless system is provided. The system includes a base station having a first frequency shifter to shift a frequency of a first downlink signal to produce a first frequency-shifted downlink signal having a first center frequency; a second frequency shifter to shift a frequency of a second downlink signal to produce a second frequency-shifted downlink signal having a second center frequency that is different from the first center frequency; an adder to combine the first and second frequency-shifted downlink signals to produce a combined downlink signal; and a radio frequency (RF) module to convert the combined downlink signal to a combined RF signal that includes information about the first downlink signal and the second downlink signal.

In general, in another aspect, an apparatus for implementing a heterogeneous wireless system is provided. The apparatus includes a first frequency shifter to shift a frequency of a first digital downlink signal to produce a first frequency-shifted digital signal, the first digital downlink signal intended for a first terminal device; a second frequency shifter to shift a frequency of a second digital downlink signal to produce a second frequency-shifted digital signal, the second digital downlink signal intended for a second terminal device; an adder to combine the first and second frequency-shifted digital signals to produce a combined digital signal; a digital-to-analog converter to convert the combined digital signal to a combined analog signal; and a radio frequency (RF) module to convert the combined baseband signal to a combined RF signal that has a first component derived from the first digital downlink signal and a second component derived from the second digital downlink signal, the first component having a first center frequency substantially the same as a first carrier frequency associated with the first terminal device, the second component having a second center frequency substantially the same as a second carrier frequency associated with the second terminal device.

In general, in another aspect, a heterogeneous wireless system is provided. The system includes a data processor configured to: combine data signals intended for a first group of multiple devices of a first type to generate a first combined signal, shift a frequency of the first combined signal to generate a first frequency-shifted combined signal having a first center frequency, combine data signals intended for a second group of multiple devices of a second type to generate a second combined signal, shift a frequency of the second combined signal to generate a second frequency-shifted combined signal having a second center frequency, and combine the first frequency-shifted combined signal and the second frequency-shifted combined signal to generate a composite downlink signal. The system includes a radio frequency module configured to generate a radio frequency downlink signal based on the composite downlink signal.

In general, in another aspect, a heterogeneous wireless system is provided. The system includes a base station having: a data processor configured to generate a composite downlink signal that includes signal components derived from data signals intended to be transmitted to devices having different frequency spectrum requirements, in which the process of generating the composite downlink signal includes: embedding location-specific signature waveforms in the signal components to enable different portions of a signal transmitted by the base station to converge at different devices that are intended to receive the respective portions, the location-specific signature waveforms each being associated with a location of a respective one of the devices, modifying a spectral distribution of the signal components based on information about a frequency spectrum associated with the base station and information about frequency spectrums associated with the devices, and combining the signal components to generate the composite downlink signal.

In general, in another aspect, a heterogeneous wireless system is provided. The system includes a base station having: a data processor configured to receive a composite uplink signal that includes components derived from a first uplink signal sent from a first device and a second uplink signal sent from a second device; modify a frequency distribution of a processed version of the composite uplink signal by an amount that is dependent on a spectral characteristic associated with the first device to generate a first frequency-shifted uplink signal; estimate first uplink data symbols sent from the first device based on the first frequency-shifted uplink signal and a first location-specific signature waveform that is associated with a location of the first device; modify a frequency distribution of a processed version of the composite uplink signal by an amount that is dependent on a spectral characteristic associated with the second device to generate a second frequency-shifted uplink signal; and estimate second uplink data symbols sent from the second device based on the second frequency-shifted uplink signal and a second location-specific signature waveform that is associated with a location of the second device.

In general, in another aspect, a heterogeneous wireless system is provided. The system includes a base station having: a data processor configured to process a composite uplink signal that includes signal components derived from data signals sent from devices having different spectral characteristics, in which the processing of the composite uplink signal includes: making one or more copies of the composite uplink signal; modifying spectral distributions of the composite uplink signal and the one or more copies of the composite uplink signal to generate frequency-shifted composite uplink signals; and estimating data symbols sent from the devices based on the frequency-shifted composite uplink signals and location-specific signature waveforms that are associated with locations of the devices.

In general, in another aspect, a method for operating a heterogeneous wireless system is provided. The method includes: at a base station, shifting a frequency of a first downlink signal to produce a first frequency-shifted downlink signal having a first center frequency; shifting a frequency of a second downlink signal to produce a second frequency-shifted downlink signal having a second center frequency that is different from the first center frequency; combining the first and second frequency-shifted downlink signals to produce a combined downlink signal; converting the combined downlink signal to a combined RF signal; and transmitting the combined RF signal, in which the combined RF signal includes information about the first downlink signal and the second downlink signal.

In general, in another aspect, a method for operating a heterogeneous wireless system is provided. The method includes: generating a first downlink signal based on data symbols to be transmitted to a first device and a location specific signature waveform that is associated with a location of the first device; generating a second downlink signal based on data symbols to be transmitted to a second device and a location specific signature waveform that is associated with a location of the second device; generating a combined downlink signal that includes a first component and a second component, the first component having a version of the first downlink signal shifted to a first carrier frequency associated with the first device, the second component having a version of the second downlink signal shifted to a second carrier frequency associated with the second device, the second carrier frequency being different from the first carrier frequency; and transmitting the combined downlink signal.

In general, in another aspect, a method for operating a heterogeneous wireless system is provided. The method includes: combining data signals intended for a first group of multiple devices of a first type to generate a first combined signal; shifting a frequency of the first combined signal to generate a first frequency-shifted combined signal having a first center frequency; combining data signals intended for a second group of multiple devices of a second type to generate a second combined signal; shifting a frequency of the second combined signal to generate a second frequency-shifted combined signal having a second center frequency; combining the first frequency-shifted combined signal and the second frequency-shifted combined signal to generate a composite downlink signal; generating a radio frequency downlink signal based on the composite downlink signal; and transmitting the radio frequency downlink signal.

In general, in another aspect, a method for operating a heterogeneous wireless system is provided. The method includes: receiving a composite uplink signal that includes components derived from a first uplink signal sent from a first device and a second uplink signal sent from a second device; modifying a frequency distribution of the composite uplink signal by an amount that is dependent on a spectral characteristic associated with the first device to generate a first frequency-shifted uplink signal; estimating first uplink data symbols sent from the first device based on the first frequency-shifted uplink signal and a first location-specific signature waveform that is associated with a location of the first device; modifying a frequency distribution of the composite uplink signal by an amount that is dependent on a spectral characteristic associated with the second device to generate a second frequency-shifted uplink signal; and estimating second uplink data symbols sent from the second device based on the second frequency-shifted uplink signal and a second location-specific signature waveform that is associated with a location of the second device.

In general, in another aspect, a heterogeneous time-reversal wireless system is provided to simultaneously communicate with multiple terminal devices with heterogeneous frequency bandwidths and spectrum allocations.

In general, in another aspect, a method of connecting devices to a network is provided. The method includes providing a first base station and a second base station to a network. The method includes at the first base station configured to communicate with devices located within a first broadcast region, receiving probe signals from a first group of terminal devices located within the first broadcast region, and calculating signature waveforms for the first group of terminal devices based on time-reversed waveforms of channel response signals derived from the received probe signals. The base station determines downlink signals for the first group of terminal devices based on the corresponding signature waveforms, each downlink signal intended to be sent to one of the first group of terminal devices, different downlink signals intended to be sent to different ones of the first group of terminal devices. The base station transmits the downlink signals to the first group of terminal devices. The method includes at the second base station configured to communicate with devices located within a second broadcast region, receiving probe signals from a second group of terminal devices located within the second broadcast region, and calculating signature waveforms for the second group of terminal devices based on time-reversed waveforms of channel response signals derived from the received probe signals. The second base station determines downlink signals for the second group of terminal devices based on the corresponding signature waveforms, each downlink signal intended to be sent to one of the second group of terminal devices, different downlink signals intended to be sent to different ones of the second group of terminal devices. The second base station transmits the downlink signals to the second group of terminal devices. The first broadcast region overlaps the second broadcast region, at least one of the terminal devices is located within the overlapped broadcast region, the first and second base stations transmit the downlink signals using the same frequency band, and the downlink signals transmitted by the first and second base stations overlap in time.

Implementations of the method may include one or more of the following features. The first and second base stations can be located within at least one of a common room, a common floor of a building, a common building, a common vehicle, or a common city block. Each base station can receive each probe signal from the corresponding terminal device through multiple wireless transmission paths, and the corresponding signature waveform is dependent on the multiple wireless transmission paths and device type. Determining a downlink transmit signal for the terminal device based on the downlink data, device type and the corresponding signature waveform can include performing a convolution of the corresponding signature waveform and the downlink data or a modified version of the downlink data to produce the downlink transmit signal. The method can include at each base station receiving a combined signal that includes uplink signals from multiple terminal devices of heterogeneous bandwidths, and determining the uplink signal from each terminal device based on the combined signal, device type and the corresponding signature waveform for the terminal device. Different terminal devices can transmit uplink signals to the same base station using the device type specific frequency band, and several uplink signals can overlap in time. Different terminal devices can transmit uplink signals to different base stations using the device type specific frequency band, and several uplink signals can overlap in time. Transmitting the downlink signals to the first group of terminal devices can include generating a combined downlink signal that combines the downlink signals, and transmitting the combined downlink signal to the first group of terminal devices through multiple wireless propagation paths. The first base station can transmit each downlink signal to a particular terminal device through multiple wireless transmission paths, and the signature waveform associated with the particular terminal device can be configured such that portions of the downlink signal propagating through the multiple wireless transmission paths interfere constructively at the location of the particular terminal device so that the signal strength at the location of the particular terminal device is stronger than at other locations. The signal strength at the location of the particular terminal device can be at least 3 dB stronger than at other locations more than a half of a wavelength away. The terminal devices can include at least one of environment sensors, utility meters, electrical appliances, lighting devices, audio-video devices, cameras, phones, climate control systems, power generators, timing devices, plant care devices, clothing, food containers, beacons, components in assembly lines, vehicles, or robots.

In general, in another aspect, a system for connecting multiple devices to a network is provided. The system includes base stations in which each base station has a network port for connecting to a network, and an input module to receive probe signals from terminal devices with heterogeneous bandwidths that intend to communicate with the base station. The base station includes a data processor to, for each of the terminal devices with heterogeneous bandwidths that intends to communicate with the base station, calculate a signature waveform based on a time-reversed waveform of a channel response signal derived from the corresponding probe signal on the device type specific frequency band. For each of the terminal devices that the base station intends to transmit downlink data, the data processor determines a downlink transmit signal for the terminal device based on the downlink data, device type and the corresponding signature waveform. The system includes an output module to transmit the downlink signals to the terminal devices. Each base station has a broadcast region such that terminal devices within the broadcast region can communicate with the base station, several base stations are positioned at locations such that they have overlapping broadcast regions, and the base stations are configured to transmit the downlink signals using a common frequency band.

Implementations of the system may include one or more of the following features. The data processor can determine a downlink transmit signal for the terminal device based on the downlink data, device type and the corresponding signature waveform by performing a convolution of the corresponding signature waveform and the downlink data or a modified version of the downlink data and going through the device type specific multirate signal processing to produce the downlink transmit signal. At each base station, the input device can receive a combined signal that includes uplink signals from multiple terminal devices belonging to same or different device types, and the data processor can determine the uplink signal from each terminal device based on the combined signal, device type and the corresponding signature waveform for the terminal device. The data processor can generate a combined downlink signal that combines the downlink signals, and the output module can transmit the combined downlink signal to the terminal devices through multiple wireless propagation paths. Each base station can transmit each downlink signal to a particular terminal device through multiple wireless transmission paths, and the signature waveform associated with the particular terminal device can be configured such that portions of the downlink signal propagating through the multiple wireless transmission paths interfere constructively at the location of the particular terminal device so that the signal strength at the location of the particular terminal device is stronger than at other locations. The signal strength at the location of the particular terminal device can be at least 3 dB stronger than at other locations more than a half of a wavelength away. The base station can be part of at least one of an environment sensors hub, a utility meter hub, an electrical appliance, a lighting device, an audio-video device, cameras, a phone, a climate control system, a power generator, a timing device, a plant care device, a wearable device hub, a food container hub, a beacon hub, a component in an assembly line, a vehicle, or a robot.

Other aspects include other combinations of the features recited above and other features, expressed as methods, apparatus, systems, program products, and in other ways.

Advantages of the aspects and implementations may include one or more of the following. Time-reversal systems can have low power consumption, good interference reduction, provide better battery life, and support multiple concurrent active users. The proposed heterogeneous time-reversal system can directly connect devices with heterogeneous bandwidths, which is a unified framework compared with middleware approach. The asymmetric architecture of heterogeneous time-reversal systems can reduce the computational complexity and thus the cost of the terminal devices, the total number of which is typically very large for the Internet of Things. The removal of middleware in the proposed system better satisfies the low-complexity and energy-efficiency of Internet of Things. The unique location-specific signatures in heterogeneous time-reversal systems can provide physical-layer security and enhance the privacy and security of customers in the Internet of Things.

DETAILED DESCRIPTION

Overview of Time-Reversal Wireless System

Figure 1A:
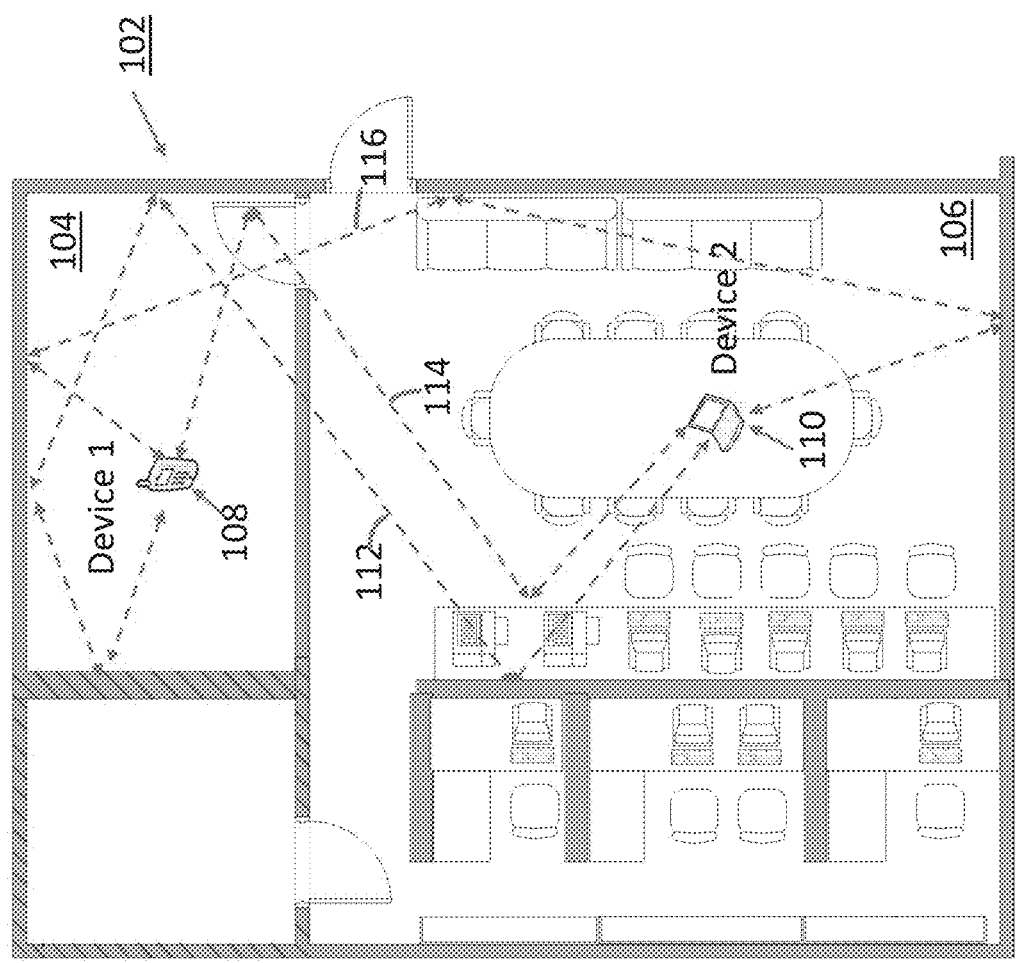
FIG. 1A is a diagram showing an exemplary environment for operating a time-reversal system.

The following provides an overview of a time-reversal wireless system. Referring to FIG. 1A, a time-reversal system can be used in an environment having structures or objects that may cause one or more reflections of wireless signals. For example, a venue 102 may have a first room 104 and a second room 106. When a first device 108 in the first room 104 transmits a signal to a second device 110 in the second room 106, the signal can propagate in several directions and reach the second device 110 by traveling through several propagation paths, e.g., 112, 114, and 116. The signal traveling through multiple propagation paths is referred to as a multipath signal. As the signal travel through the propagation paths, the signal may become distorted. The multipath signal received by the second device 110 can be quite different from the signal transmitted by the first device 108.

Figure 1B:
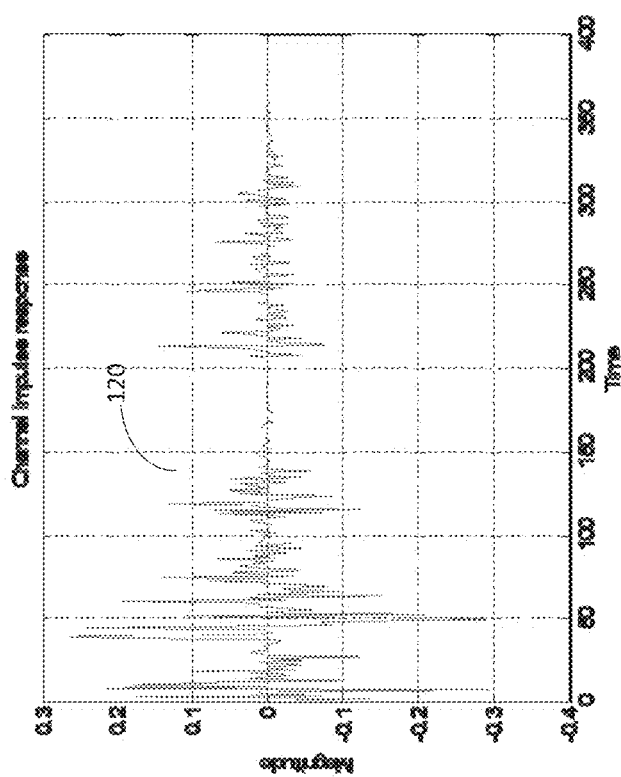
FIG. 1B is a graph of an exemplary recorded channel response waveform.

For example, referring to FIG. 1B, when the first device 108 sends a pulse signal, the signal received by the second device 110 may have a waveform 120. The waveform 120 is referred to as the channel impulse response (CIR) signal.

Figure 1C:
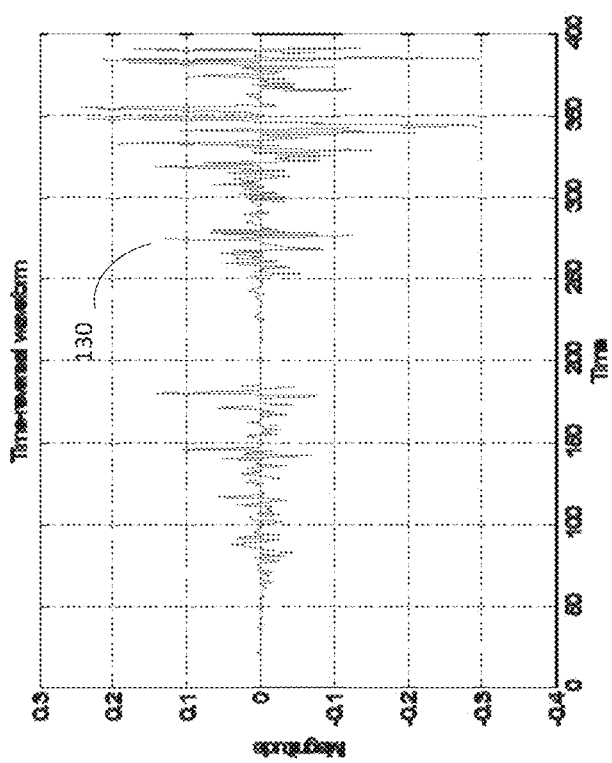
FIG. 1C is a graph of an exemplary time-reversed waveform generated by reversing the waveform of FIG. 1B with respect to time.

Referring to FIG. 1C, a time-reversed waveform 130 can be generated by reversing the waveform 120 with respect to time. If the second device 110 sends a signal having the waveform 130, the signal will propagation in various directions, including through propagation paths 112, 114, and 116 (in reverse direction relative to the propagation direction of the impulse signal), and reach the first device 108. The multipath signal received at the first device 108 may form an impulse signal that is similar to the impulse signal previously sent from the first device 108 to the second device 110.

The waveforms 120 and 130 shown in FIGS. 1B and 1C are merely examples. The waveforms in time-reversal systems can vary depending on, e.g., the environment and the information or data being transmitted. In addition, the initial signal sent from the first device 108 can be any sort of signal, of which an impulse is just one example. The initial signal can be any waveform.

When the second device 110 intends to transmit a data stream to the first device 108, the second device 110 may use a normalized time-reversed conjugate of the signal received from the device 108 as a basic transmission waveform. The second device 110 may encode the data stream on the basic waveform and transmit the signal through the wireless channel. The signal received at the device 108 may be described as the convolution of the transmitted signal and the channel impulse response, plus additive white Gaussian noise. Because the transmitted signal has been designed based on a time reversed version of the channel impulse response, the first device 108 may only need to perform a simple adjustment to the received signal and down-sample it to recover the data stream transmitted by the second device 110.

In some examples a transmitting device or base station or access point may send signals to two or more receiving devices at the same time. The transmitted signals travel through multiple propagation paths to each receiver. Because the receivers are positioned at different locations, the multipath signals travel through different propagation paths to reach the receivers. By carefully constructing the waveform of the signal sent from the transmitter, it is possible to allow each receiver to receive data intended for the receiver with sufficient high quality.

Figure 2:
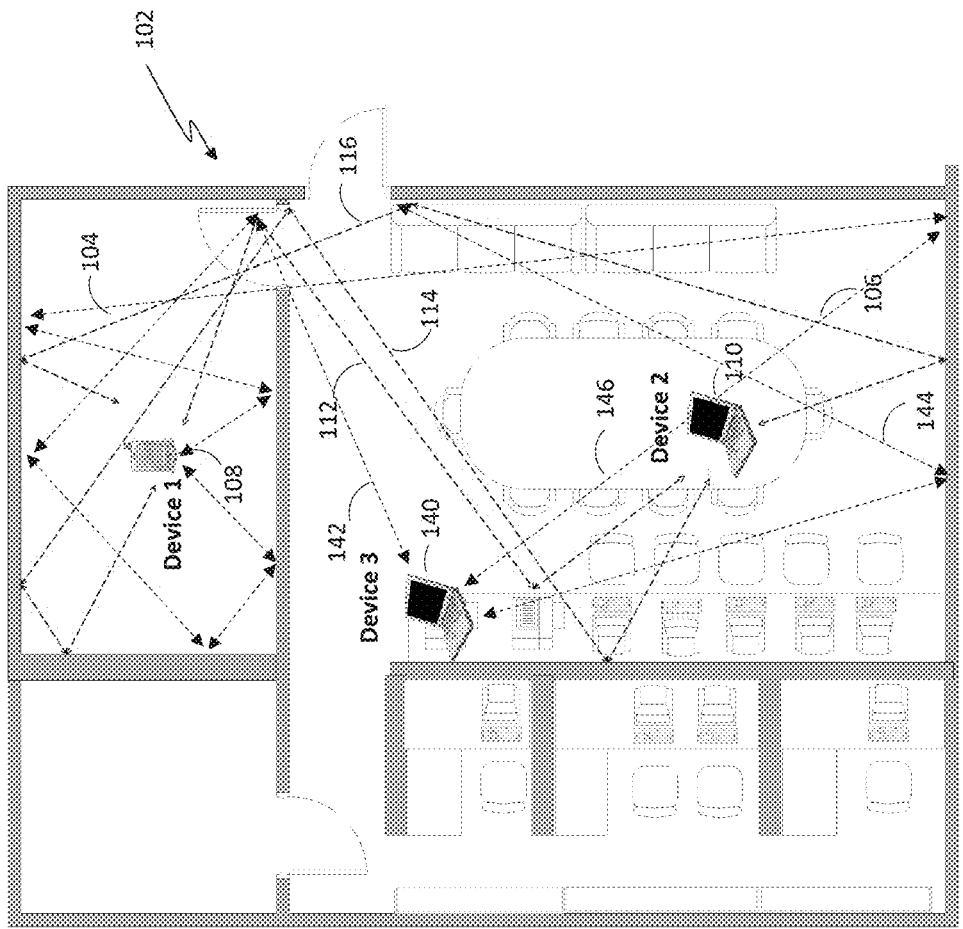
FIG. 2 is a diagram showing an exemplary environment for operating a time-reversal system having multiple receivers.

Referring to FIG. 2, the first device 108 may communicate with the second device 110 and a third device 140. The second device 110 may send a probe signal that travels through propagation paths 112, 114, and 116 to the first device 108. The probe signal can be, e.g., a pulse signal, a signal that has a predetermined waveform, or a signal that includes symbols. The first device 108 may record the received waveform representing the channel response for a first multipath channel. The third device 140 may send a probe signal that travels through propagation paths 142, 144, and 146 to the first device 108. The first device 108 may record the received waveform representing the channel response for the second multipath channel.

The first device 108 constructs a downlink signal based on a first time-reversed multipath channel response, a second time-reversed multipath channel response, a first data stream intended for the second device 110, and a second data stream intended for the third device 140. The first device 108 may transmit the downlink signal so that a first portion of the downlink signal travels through propagation paths 112, 114, and 116 to reach the second device 110. A second portion of the downlink signal may travel through propagation paths 142, 144, and 146 to reach the third device 140. The first signal portion received at the second device 110 may form a first data stream. The second signal portion received at the third device 140 may form a second data stream.

In the example of FIG. 2, the first device 108 transmits two data streams simultaneously to the second device 110 and the third device 140. Using the same principle, the second device 110 can receive channel impulse response signals from the first device 108 and the third device 140, and then transmit two data streams simultaneously to the first device 108 and the third device 140 using waveforms that are determined according to time-reversed channel impulse response signals. The third device 140 can also receive channel impulse response signals from the first device 108 and the second device 110, and then transmit two data streams simultaneously to the first device 108 and the second device 110 using waveforms that are determined according to time-reversed channel impulse response signals. In general, when there are three or more devices, each device can transmit two or more data streams simultaneously to two or more other devices.

Heterogeneous Time-Reversal Wireless System

A big challenge of indoor communication and indoor Internet of Things applications is the presence of many multi-paths with similar path lengths. While multipath fading may be known to cause problems in communication and may often be suppressed by rake receivers or equalizers, time reversal machine (TRM) technology recognizes hidden values of multi-paths and seeks to capture and exploit the inherent structures of the multi-paths to achieve high communication capacity, low power consumption, good battery life, collision-free multiple access, low cost terminal devices, heterogeneous terminal devices, indoor positioning, life detection, scalability, privacy and security, etc. A high sampling frequency may be used to capture the useful details of the multi-paths. The following are some of the advantages that may be achieved by the TRM system.

High communication capacity: The TRM system supports spatial division multiple access supporting high throughput for each TRM device (e.g., Internet of Things devices, smart phones, smart devices). The TRM system achieves high signal-to-noise ratio due to its inherent nature to fully harvest energy from the surrounding environment by exploiting the multi-path propagation to recollect all the signal energy that could be collected as the ideal RAKE receiver. The achievable rate can be very high when the bandwidth is sufficiently wide.

Good battery life: Many TRM devices (e.g., Internet of Things devices, smart phones, smart devices) may be powered by small batteries. The TRM devices may need to be designed to have low power consumption and use wireless communication techniques that have low computational complexity. The TRM system uses physics instead of electronics to perform channel equalization and thus supports low power consumption and low computational complexity. The TRM system has a potential of over an order of magnitude of power consumption reduction and interference alleviation, which means that the TRM system can provide better battery life and support multiple concurrent active users.

Collision-free multiple access: The TRM system allows many active TRM devices to connect to the Internet and transmit/receive data concurrently without collision with other TRM devices. The TRM system uses low-interference wireless technologies to reduce the interference among and within devices or things.

Low cost terminal devices: The TRM system is designed so that most of the processing for signal communication is performed at the base station, thus allowing the terminal TRM devices (e.g., handsets, smart devices, Internet of Things devices), to be simple with low cost, low power consumption and good battery life. The terminal TRM devices only need to perform simple processing and thus can use low cost processors. In some examples, by using an asymmetric TRM architecture, only a simple one-tap detection is needed.

Heterogeneous terminal devices: The TRM system can support a high level of heterogeneity among the TRM devices connected to the Internet. For example, TRM devices that have different functionality, technology, and application fields can communicate with one another. The wireless technology used by the TRM system can support heterogeneous terminal devices with different quality-of-service (QoS) options, such as bit rate, adjustment of waveform and back-off factor. Conventional technologies (e.g., ZigBee, Z-Wave, Bluetooth, and WiFi) may not simultaneously support a high level of heterogeneity among terminal devices and support a wide range of density of terminal devices.

Secure communication: The TRM system provides added security by using spatial division multiple access. Only the intended TRM device at a particular location can receive the intended information. The unique location-specific signature in the TRM system can provide additional physical-layer security and thus can enhance the privacy and security of customers.

Indoor positioning: The TRM system exploits the details of the multi-paths so that each TRM device can determine the current location of the individual receiver.

Life detection: The TRM system exploits the changes of the details of the multi-paths and allows TRM devices to detect movements of living things in the environment, e.g., breathing of humans in the environment.

Scalability: The system supports a wide range of density of TRM devices (e.g., Internet of Things devices, smart phones, smart devices) and uses wireless technology that is highly scalable to provide satisfactory quality of service for low to high density areas.

Privacy and security: The TRM system allows each TRM device (e.g., Internet of Things device, smart device, smart phone) to have a unique identification, and ensures privacy and the security of the customers.

The broadband wireless channels used by the time reversal communication may be a set of wireless channels (e.g., Wi-Fi channels with 20 or 40 MHz bandwidth, Zigbee, BlueTooth, Z-Wave), mobile communication channels (e.g., 3G/4G/5G/6G, WiMax), etc. Multiple antennas may be used in the transmitter and receiver. Multiple narrow-band channels may be combined to achieve a large effective bandwidth.

Figure 3:
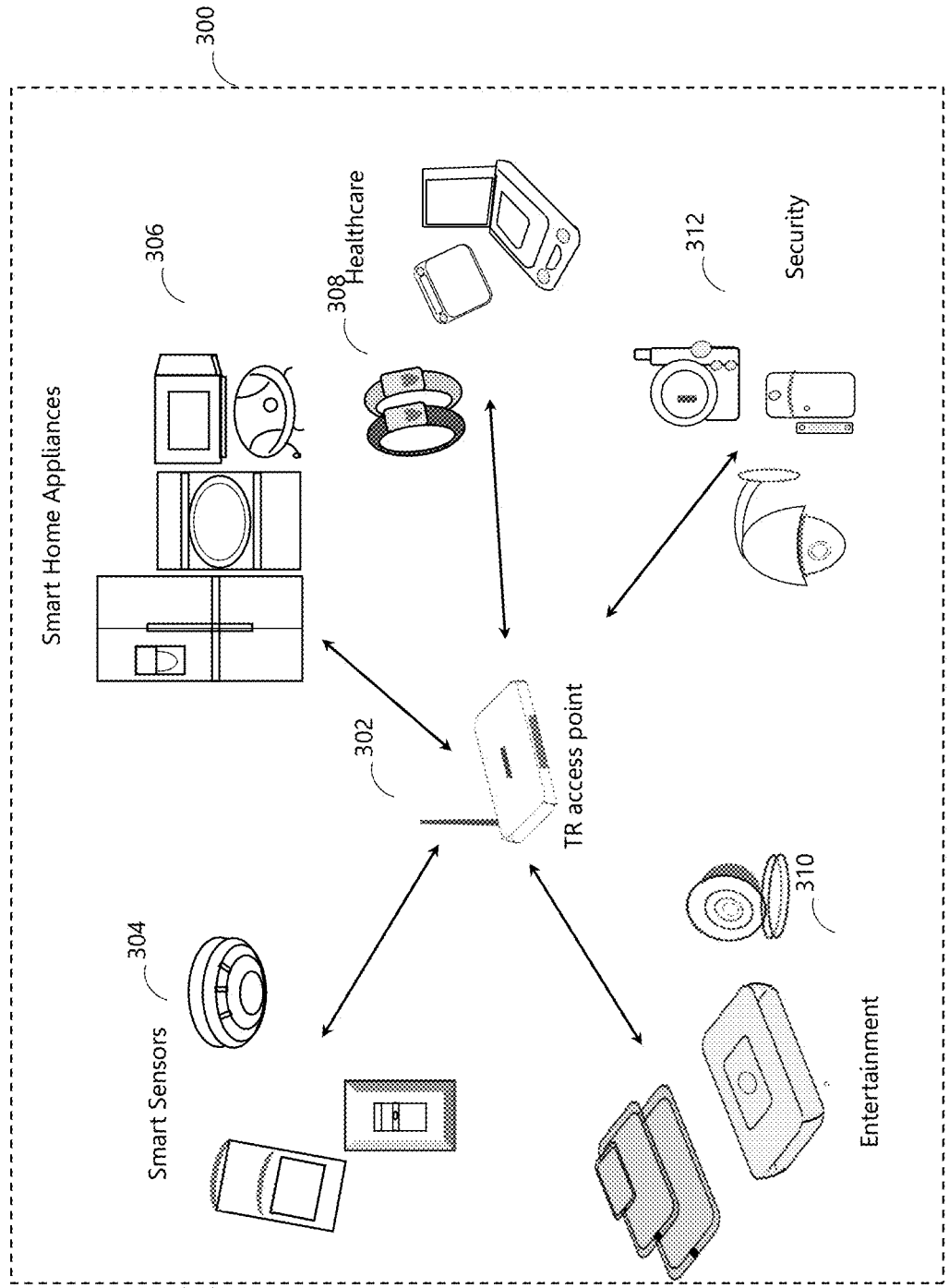
FIG. 3 is a graph showing an exemplary heterogeneous time-reversal system for the Internet of Things.

This disclosure provides a heterogeneous time-reversal wireless communication system for implementing the Internet of Things. Referring to FIG. 3, in some implementations, a time-reversal wireless communication system 300 includes time-reversal base stations 302 that communicate with many things, objects, or devices, such as smart sensors 304, smart home appliances 306, healthcare devices 308, entertainment devices 310, and security devices 312, etc. For example, the smart home appliance 306 may have embedded sensors that can communicate with base stations.

The following describes an example of a time-reversal communication system assuming all devices share the same frequency and bandwidth. The channel impulse response between two transceivers is modeled as $$h(t)=\Sigma_{v=1}^{V}h_{v}\delta(t-\tau_{v}), \qquad (1)$$

where $h_v$ is the complex channel gain of the v-th path of the channel impulse response, $\tau_v$ is the corresponding path delay, and V is the total number of the underlying multi-paths (assuming infinite system bandwidth and time resolution). Without loss of generality, we assume that $\tau_1=0$ in the following discussion, i.e., the signal at the first path arrives at time t=0, and as a result, the delay spread of the multi-path channel $\tau_C$ is given by $\tau_C=\tau_V-\tau_1=\tau_V$.

Considering a communication system with a limited bandwidth, pulse shaping filters can be deployed to limit the effective bandwidth of transmission. In some examples, raised-cosine filter can be used as a pulse shaping filter that reduces the inter-symbol-interference (ISI). Generally, the raised-cosine filter is splitted into two root-raised-cosine filters $RRC_{B,f_s}[n]$ and deployed at each side of the transceivers, where B is the available bandwidth and $f_s$ is the sample rate of the system. In some examples, based on the Nyquist rate, an α-times oversampling (i.e., $f_s=\alpha B$) is implemented to counter the sampling frequency offset (SFO).

Channel Probing Phase

Figure 4:
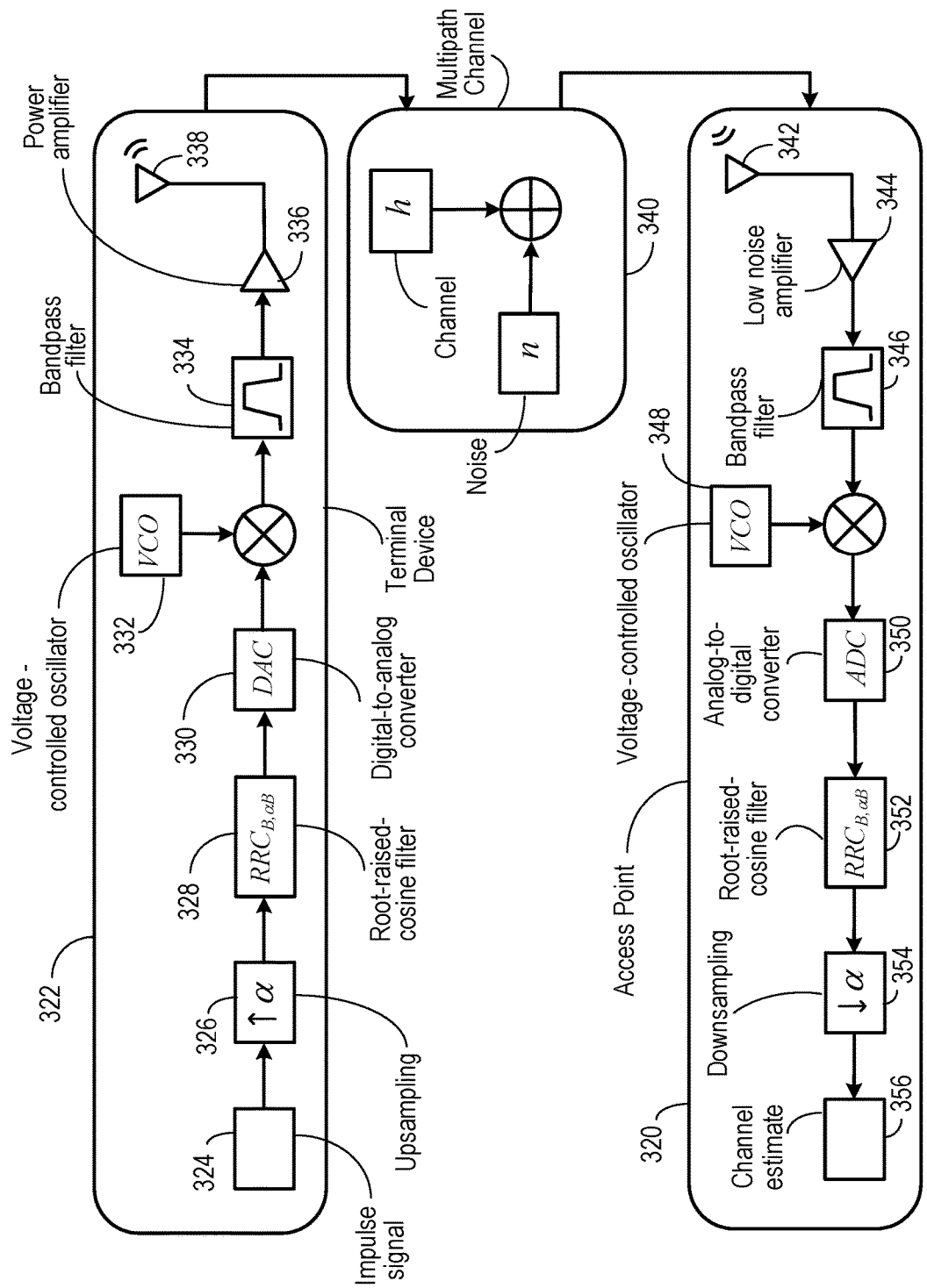
FIG. 4 is a diagram showing the channel probing phase of an exemplary homogeneous time-reversal system.

Referring to FIG. 4, channel probing is performed when an access point (AP) 320 communicates with a terminal device 322 using time-reversal communication technology. In general, time-reversal communication includes a channel probing phase followed by a data transmission phase. Prior to the access point's time-reversal transmission of data, in the channel probing phase, the terminal device 322 upsamples an impulse signal 324 by α using an upsampling unit 326, filters the upsampled signal by using α root-raise-cosine (RRC) filter $RRC_{B,f_s}$ 328, where B is the bandwidth and $f_s=\alpha B$ is the sample rate. One of the purposes of increasing the bit rate is that by oversampling, we can obtain the correct sample when there exists sample frequency offset between the transmitter and the receiver in the data transmission phase. Since the oversampling is one of the steps in the data transmission phase, to estimate the channel correctly, we also include oversampling and downsampling in the channel probing phase. The value of a can be chosen by the user. For example, a can be chosen to be equal to 4, but can also be other values. The root-raised-cosine filter can perform pulse shaping to limit the bandwidth. In the heterogeneous time-reversal system, different types of devices use different bandwidths, so the bandwidths of the root-raised-cosine filters for the different types of devices are also different.

The filtered signal is converted to an analog baseband signal by a digital-to-analog converter (DAC) 330. The baseband signal is modulated to a high carrier frequency by a voltage-controlled oscillator (VCO) 332, then put through a bandpass filter 334 and amplified by a power amplifier 336 to produce a radio frequency (RF) signal. The RF signal is broadcasted by an antenna 338. The broadcast signal passes through a multipath channel 340 having a profile h, in which noise n' is added to the signal. The broadcast signal is captured by an antenna 342 at the access point 320. The captured signal is amplified by a low-noise amplifier (LNA) 344, filtered by a bandpass filter 346, and converted to the analog baseband signal using a voltage-controlled oscillator 348. The baseband signal is sampled by an analog-to-digital converter (ADC) 350 with a sample rate $f_s=\alpha B$ to produce a digital signal. The digital signal is filtered by a root-raised-cosine filter $RRC_{B,f_s}$ 352 and downsampled by a factor α by a downsampling unit 354. Because an impulse signal was transmitted by the terminal device 322, the downsampled signal is treated as a channel estimate $\hat{h}$ 356.

The root-raised-cosine filter 328 is a digital filter, and the root-raised-cosine filter 352 is an analog filter, they both have the same bandwidth. The bandpass filter 334 defines the frequency band used by the terminal device 322. Thus, if the terminal device 322 includes a bandpass filter 334 having a passband from frequency f1 to frequency f2, we say that the terminal device 322 uses or is associated with the frequency band f1 to f2. In the example of FIG. 4, the passband of the bandpass filter 334 in the terminal device 322 is the same as the passband of the bandpass filter 346 in the access point 320.

The access point 320 can also be a base station or a transceiver that communicates with multiple other devices using the communication techniques described here.

With a sampling rate $f_s=\alpha B$, the discrete channel impulse response can be written as $$\overline{h}[n]=\Sigma_{v=1}^{V}h_v\delta[nT_s-\tau_v], \quad (2)$$

where $T_S=1/(\alpha B)$. Assume perfect channel estimation (noise and interference are ignored in the channel probing phase), the equivalent channel impulse response between two root-raised-cosine filters 328, 352 in FIG. 4 is written as $$\tilde{h}=(RRC_{B,f_s}*\overline{h}*RRC_{B,f_s}). \quad (3)$$

Based on the polyphase identity, the equivalent channel impulse response (between the expander and decimator) for the system with bandwidth B can be represented as $$\hat{h}=(RRC_{B,f_s}*\overline{h}*RRC_{B,f_s})_{[\alpha]}, \quad (4)$$

where $(\bullet)_{[\alpha]}$ represents α-times decimation. From equation (4), one can see that those paths represented in equation (2), whose time differences are within the main lobe of raised-cosine filter, are mixed together for the system with a limited bandwidth B.

In FIG. 4, the upsampling unit 326 and the root-raised-cosine filter 328 of the terminal device 322 can be implemented using, e.g., a digital signal processor, a field programmable gate array (FPGA), or discrete components. Similarly, the root-raised-cosine filter 352 and the downsampling unit 354 of the access point 320 can be implemented using, e.g., a digital signal processor, a field programmable gate array (FPGA), or discrete components.

Data Transmission Phase

Upon acquiring the equivalent channel impulse response $\hat{h}$, different designs of signature waveforms (e.g., basic time-reversal signature, zero forcing (ZF) signature, and minimum mean square equalizer (MMSE) signature) can be implemented at the access point side. Assuming the basic time-reversal signature is considered, the access point time-reverses (and conjugates, when complex-valued) the equivalent channel impulse response $\hat{h}$, and uses the normalized time-reversal waveform as the basic time-reversal signature g, i.e., $$g[n] = \frac{\hat{h}^*[L-1-n]}{\|\hat{h}\|}, \quad (5)$$

where L is the number of taps in $\hat{h}$.

Figure 5:
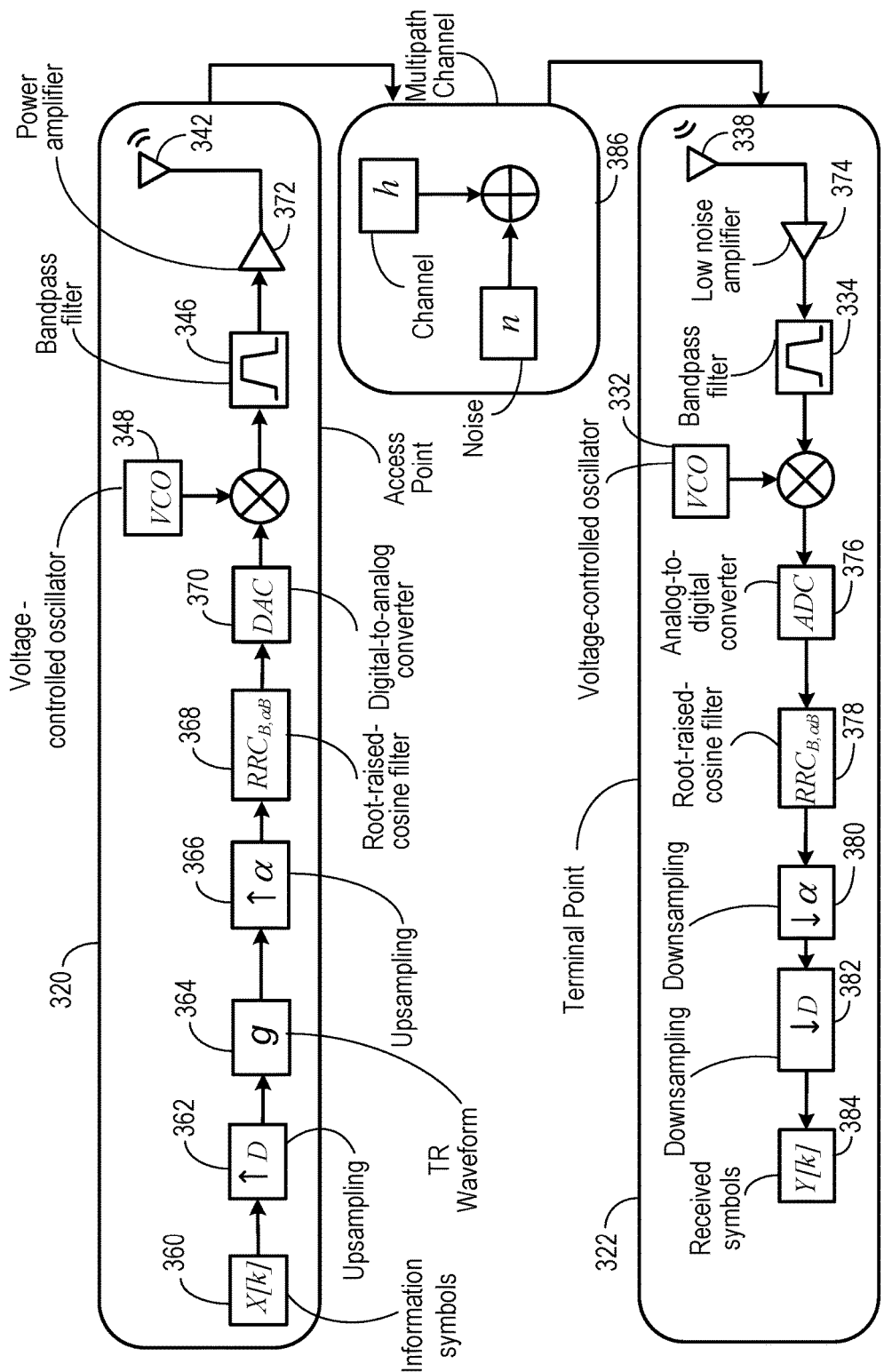
FIG. 5 is a diagram showing the downlink transmission phase of a conventional homogeneous time reversal system.

A diagram of the procedures of time-reversal data transmission is shown in FIG. 5. The diagram can also represent the modules used in the time-reversal data transmission. There is a sequence of information symbols X[k] 360 to be transmitted to the terminal device 322. To match the symbol rate with the system chip rate 1/B, the symbols 360 are upsampled by backoff factor D using an upsampling unit 362. The upsampled symbols are filtered by the signature waveform g at unit 364, the signature embedded symbols are upsampled by a at an upsampling unit 366, and filtered by a root-raised-cosine filter $RRC_{B,\alpha B}$ 368. The filtered digital signal is converted to an analog baseband signal by a DAC 370. The baseband signal is modulated to a high carrier frequency by the voltage-controlled oscillator 348, put through the bandpass filter 346 and amplified by a power amplifier 372 to produce an RF signal. The RF signal is broadcasted by the antenna 342. The broadcast signal passes through a multipath channel 386 having a profile h, in which the signal is corrupted with additive noise n. The broadcast signal is captured by the terminal device antenna 338, amplified by a low noise amplifier 374, filtered by the bandpass filter 334, and carried to baseband signal by the voltage-controlled oscillator 332 to produce an analog baseband signal. The analog baseband signal is converted to a digital signal by an ADC 376 having a sampling rate $f_s = \alpha B$ to produce a digital signal that is filtered by a root-raised-cosine filter 378 and downsampled by a factor $\alpha$ using downsampling unit 380 and downsampled by a factor D using downsampling unit 382 to produce a downsampled signal Y[k] 384, which can be used to estimate the transmitted information symbol X[k] 360.

Referring again to FIG. 5, after a rate backoff factor D is introduced to match the symbol rate with chip rate by inserting (D−1) zeros between two symbols, i.e., $$X^{[D]}[k] = \begin{pmatrix} X[k/D], & \text{if } (k \bmod D) = 0, \\ 0, & \text{if } (k \bmod D) \neq 0, \end{pmatrix} \quad (6)$$

where $(\cdot)^{[D]}$ denotes the D-times interpolation, the signature embedded symbols before the $\alpha$-times expander can be written as $$S[k] = (X^{[D]} * g)[k]. \quad (7)$$

Based on the previous derivation in the channel probing phase, the system components between the expander and decimator in FIG. 4 can be replaced by $\hat{h}$. Therefore, the signal received at the terminal device side before the decimator with rate D is the convolution of S[k] and $\hat{h}$, plus additive white Gaussian noise (AWGN) $\tilde{n}[k]$ with zero-mean and variance $\sigma_N^2$, i.e., $$Y^{[D]}[k] = (S * \hat{h})[k] + \tilde{n}[k]. \quad (8)$$

Then, terminal device 322 decimates the symbols with backoff factor D in order to detect the information symbols {X[k]}, i.e., $$Y[k] = \sqrt{p_u} (\hat{h} * g)[L-1]X\left[k - \frac{L-1}{D}\right] + \sqrt{p_u} \sum_{l=0, l \neq (L-1)/D}^{(2L-2)/D} (\hat{h} * g)[Dl]X[k-l] + n[k], \quad (9)$$

where $n[k] \triangleq \tilde{n}[Dk]$ and $p_u$ stands for the power amplifier.

Benefiting from temporal focusing, the power of $(\hat{h} * g)$ achieves its maximum at (L−1) for $$X\left[k - \frac{L-1}{D}\right],$$

i.e., $$(\hat{h} * g)[L-1] = \frac{\sum_{l=0}^{L-1} \hat{h}[l]\hat{h}^*[l]}{\|\hat{h}\|} = \|\hat{h}\|. \quad (10)$$

Consequently, the resulting signal-to-interference-plus-noise ratio (SINR) is obtained as $$SINR = \frac{p_u \|\hat{h}\|^2}{p_u \sum_{l=0, l \neq (L-1)/D}^{(2L-2)/D} |(\hat{h} * g)[Dl]|^2 + \sigma_N^2}, \quad (11)$$

assuming that each information symbol X[k] has unit power.

Figure 6:
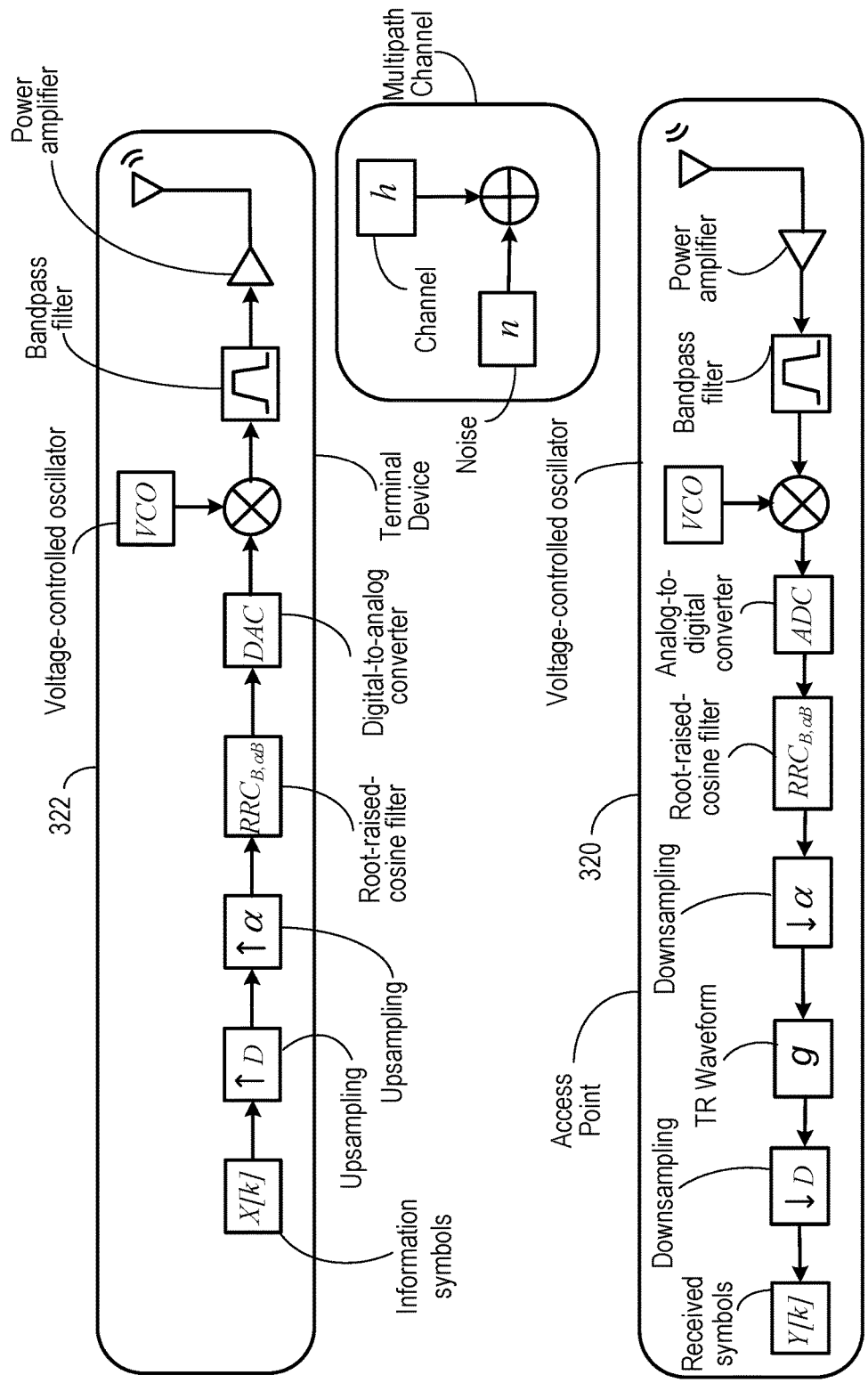
FIG. 6 is a diagram showing the uplink transmission phase of a conventional homogeneous time reversal system.

Regarding the uplink, the previously designed signature waveform g serves as the equalizer at the access point side as shown in FIG. 6. Similar to the signal flow in the downlink, the access point 320 can detect the information symbol based on the temporal focusing of $(\hat{h} * g)$ in the uplink. Such a scheme of both downlink and uplink is defined as the asymmetric architecture, which provides the asymmetric complexity distribution between the access point 320 and the terminal device 322. The asymmetric complexity distribution between access points (or base stations) and terminal devices is described in U.S. patent application Ser. No. 13/969,271, filed on Aug. 16, 2013, titled "Time-Reversal Wireless Systems Having Asymmetric Architecture," herein incorporated by reference in its entirety.

Note that the homogeneous time-reversal system can be extended to multi-user scenario, which exploits the spatial degrees of freedom in the environment and uses the multipath profile associated with each user's location as a location-specific signature for the user. A time-reversal division multiple access system in which a base station transmits downlink data to multiple terminal users is described in U.S. Pat. No. 9,226,304, the entire contents of which are incorporated by reference. A multi-user time-reversal system in which the RF signals transmitted to or from different terminal devices have the same (or substantially the same) center frequency and bandwidth is referred to as a homogeneous time-reversal system. In a homogeneous time-reversal system, different users can adopt different rate backoff factors to accommodate the different QoS requirements for various applications in the Internet of Things. In the homogeneous time-reversal system, all devices in the system share the same bandwidth and thus the same sampling rate, which increases not only the hardware cost but also computation burden for the low-end terminal devices.

The following describes a heterogeneous time-reversal system that supports the heterogenous QoS required by diverse applications, as well as heterogeneous hardware capabilities (such as bandwidth, sampling rate, computational power, and storage capacity, etc.).

Heterogeneous Time-Reversal System for Internet of Things

Figure 7:
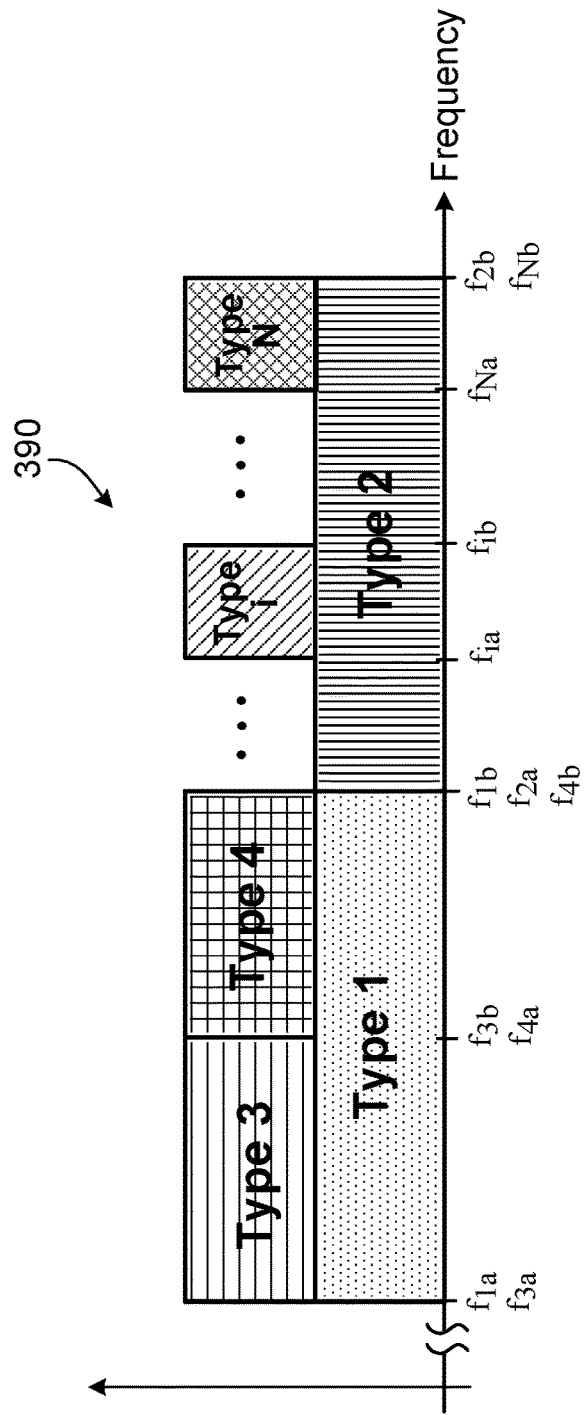
FIG. 7 is a graph of an exemplary spectrum allocation of devices with heterogeneous bandwidth.

Referring to FIG. 7, in a heterogeneous time-reversal system, N types of terminal devices with distinct spectrum allocation and bandwidths are supported simultaneously by a single access point. FIG. 7 is a graph 390 showing that different types of terminal devices can have different carrier frequencies ($f_{c_i}$) and bandwidths ($B_i$). In this example, a type 1 device can use a frequency band from frequency $f_{1a}$ to frequency $f_{1b}$, in which the carrier frequency is $(f_{1a} + f_{1b})/2$. A type 2 device can use a frequency band from frequency $f_{2a}$ to frequency $f_{2b}$, in which the carrier frequency is $(f_{2a} + f_{2b})/2$. In general, a type i device can use a spectral band from frequency $f_{1a}$ to frequency $f_{1b}$, in which the carrier frequency is $(f_{1a} + f_{1b})/2$. Different types of devices can use frequency bands that either overlap or not overlap. In the example of FIG. 7, type 1 devices and type 2 devices use different frequency bands that do not overlap. For example, f2a can be equal to or greater than f1b. Type 3 devices and type 4 devices can use different frequency bands that do not overlap. For example, f4a can be equal to or greater than f3b. In the example of FIG. 7, type 3 and type 4 devices can use frequency bands that overlap the frequency band used by the type 1 devices. Type 5 to type N devices can use frequency bands that overlap the frequency band used by the type 2 devices. The frequency band allocation shown in FIG. 7 is just an example, other ways of allocating frequency bands to various devices can also be used.

In order to support the heterogeneous terminal devices, there are several modifications at both access point and terminal device sides of the homogeneous time-reversal system. As stated before, heterogeneous terminal devices of different types have distinct center frequencies ($f_{c_i}$'s) and bandwidths ($B_i$'s). First of all, the radio-frequency (RF) components of different types have to be distinct. Specifically, the oscillation frequency of the voltage-controlled oscillator at type i terminal device is set to $f_{c_i}$ and the bandwidth of analog bandpass filter is $B_i$. Then, the ADC deployed for type i terminal devices has the sampling rate of $f_{s_i} = \alpha B_i$ based on the previous discussion. Furthermore, various root-raised-cosine filters for different types are required, i.e., $RRC_{B_i, f_{s_i}}$. In order to support heterogeneous terminal devices simultaneously, the bandwidth of the access point, denoted as $B_{AP}$, is the aggregated bandwidth of all heterogeneous terminal devices. Even though more complicated digital signal processing is implemented at the access point to handle different data streams for various types, only one set of RF components is needed at the access point side. The digital signal processing includes frequency shift, rate convertor and root-raised-cosine filter. More specifically, a frequency shift component $\exp^{j\omega_i n}$ is implemented for each type of terminal devices to support multiple carrier frequencies. The parameter $\omega_i$ is determined based on the difference between the center frequency of type i device $f_{c_i}$ and the center frequency of the access point $f_{c_{AP}}$, and n is the time index. A distinct sample rate convertor (expander or decimator) with rate $\alpha B_{AP}/B_i$ is deployed for each type i terminal device to enable the multirate processing. The root-raised-cosine filter $RRC_{B_i, \alpha B_{AP}}$ for type i terminal device is utilized to limit the effective bandwidth of signals for the heterogeneous terminal devices.

Figure 8:
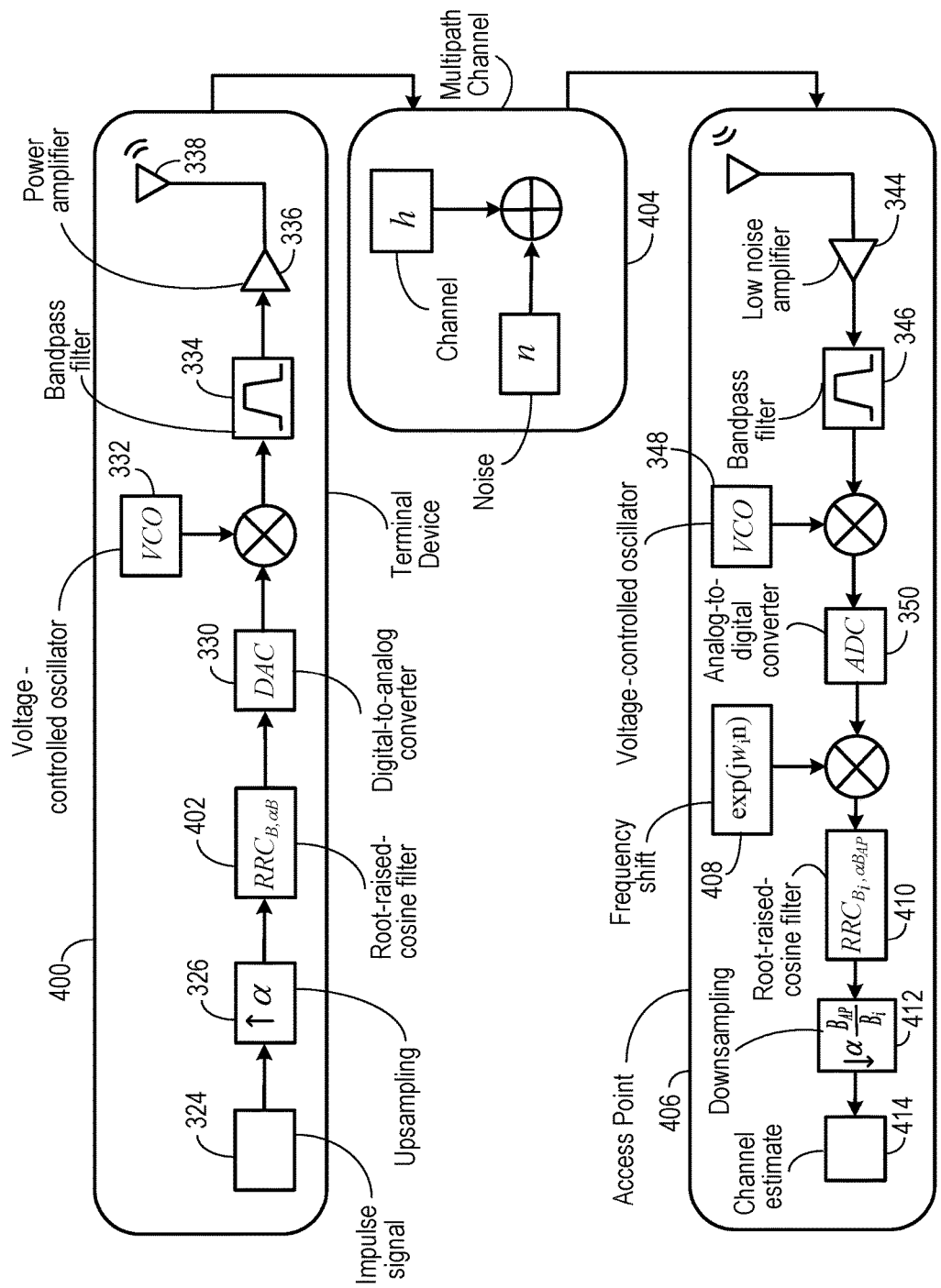
FIG. 8 is a graph of the channel probing phase of a type i device.

FIG. 8 is a diagraph of the channel probing phase of a type i terminal device. Compared with the diagram in FIG. 4, there are some differences. At a terminal device 400, prior to the data transmission phase, an impulse signal 324 is upsampled by $\alpha$ using an upsampling unit 326, filtered by a root-raised-cosine filter $RRC_{B_i, \alpha B_i}[n]$ 402, converted to an analog signal by the DAC 330, and transmitted out after going through the RF components at the terminal device side. The transmitted signal propagates to an access point 406 through a multipath channel 404 represented by $h_i(t)$. The signal captured by the access point 406 is amplified by a low-noise amplifier (LNA) 344, filtered by a bandpass filter 346, and converted in frequency using a voltage-controlled oscillator 348 to generate a baseband signal. The access point 406 samples the received signal with a higher sample rate $f_s = \alpha B_{AP}$ using the ADC 350, shifts the signal to baseband (based on the difference between $f_{c_i}$ and $f_{c_{AP}}$) using the frequency shift component 408, filters the signal through the other matched root-raised-cosine filter $RRC_{B_i, \alpha B_{AP}}[n]$ 410, downsamples the waveform by $\alpha B_{AP}/B_i$ using the downsampling unit 412, and finally records the downsampled waveform as $\hat{h}_i$, which can represent a channel estimate 414. With a sample rate $f_s = \alpha B_{AP}$, the discrete channel impulse response can be written as $$\bar{h}_i[n] = h_i(nT_s), \quad (12)$$

where $T_s = 1/(\alpha B_{AP})$.

Since the digital-to-analog convertor (DAC) 330 serves as an interpolator, the transmitted signal of the terminal device shown in FIG. 8 is mathematically equivalent to that generated through the following process: upsampled by $\alpha B_{AP}/B_i$, filtered by $RRC_{B_i, \alpha B_{AP}}[n]$, and converted to analog signal by the DAC. Therefore, similarly the equivalent channel impulse response for the type i terminal device with bandwidth $B_i$ can be expressed as $$\hat{h}_i = \sqrt{\beta_i}(RRC_{B_i, \alpha B_{AP}} * \bar{h}_i * RRC_{B_i, \alpha B_{AP}})_{[\alpha \beta_i]}, \quad (13)$$

where $\beta_i = B_{AP}/B_i$ and $\sqrt{\beta_i}$ is used to compensate the power difference between $RRC_{B_i, \alpha B_i}[n]$ and $RRC_{B_i, \alpha B_{AP}}[n]$.

Even though the channel probing by a single type of device is discussed above, the same principle can be applied to multi-type terminal devices by deploying different digital processing (, e.g., frequency shift, root-raised-cosine filtering and downsampling with type-specific factor) for multi-type devices in parallel. In other words, the access point can support heterogeneous terminal devices with one single set of RF components but more complicated digital processing.

In some implementations, system information (e.g., bandwidth and carrier frequency of the terminal device) can be transmitted from the terminal devices to the access point using one or more control channels, e.g., one or more pilot channels. When performing channel probing, the access point 406 can configure the frequency shifter 408, the root-raised-cosine filter 410, and the downsampling unit 412 with the appropriate parameters based on the system information provided by the terminal devices.

Data Transmission Phase

Suppose N types of terminal devices are communicating with the access point simultaneously, where the number of terminal devices in type i is denoted as $M_i$. Upon acquiring the equivalent channel impulse responses, the signature waveform $g_{i,j}$ is determined for the $j^{th}$ terminal device in the type i with various existing design methods. Here, we use the basic time-reversal signature design as an example, $$g_{i,j}[n] = \frac{\hat{h}^*_{i,j}[L-1-n]}{\|\hat{h}_{i,j}\|}, \quad (14)$$

where $\hat{h}_{i,j}$ is defined in (13).

Figure 9:
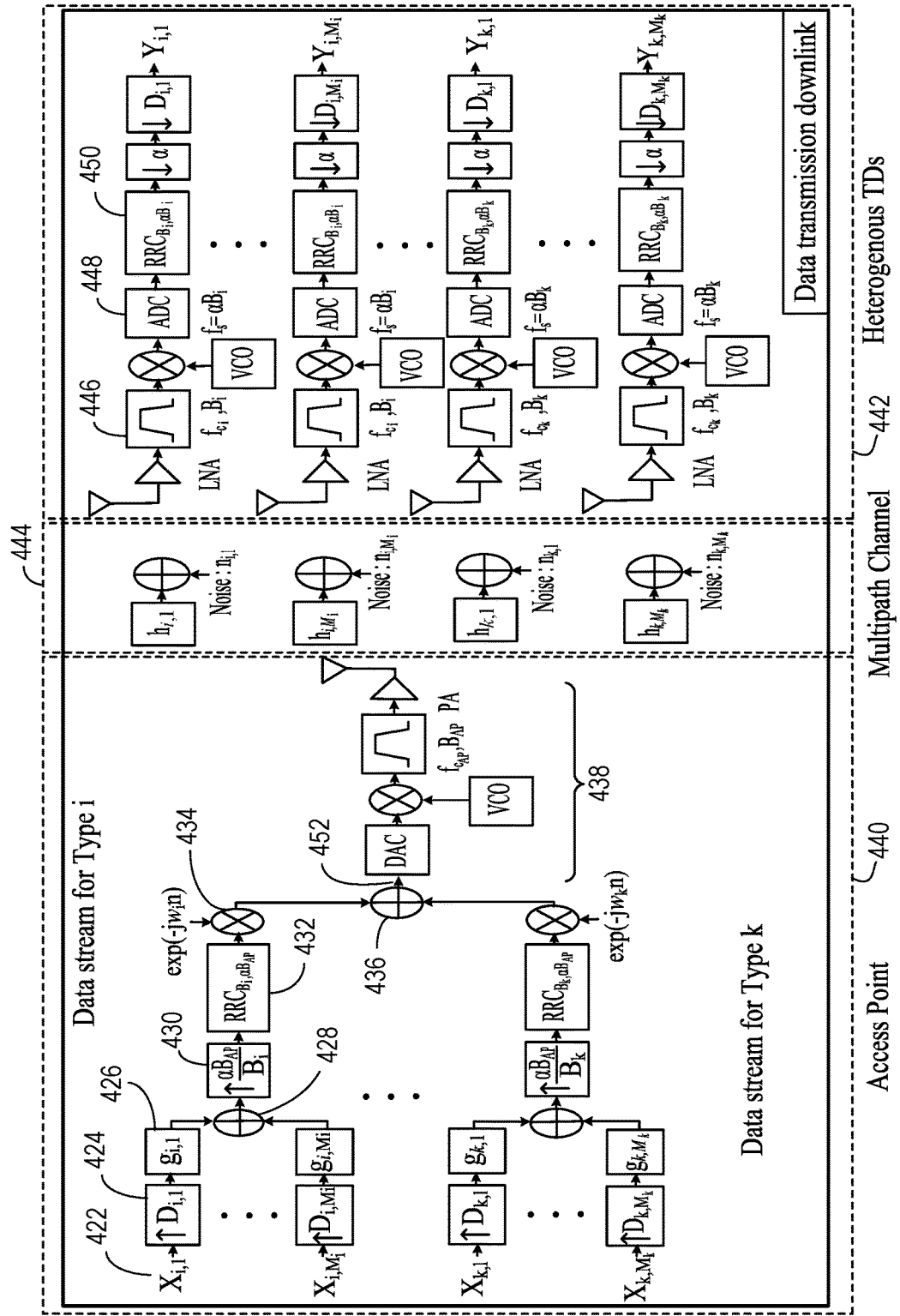
FIG. 9 is a diagram of an exemplary time-reversal division multiple access downlink system with heterogeneous devices.

First, the downlink data transmission from an access point 440 to heterogeneous terminal devices 442 in a heterogeneous system 420 is considered. Referring to FIG. 9, let $\{X_{i,j}[k]\}$ 422 be the sequence of information symbols transmitted to the $j^{th}$ terminal device of type i. Similar to the case in the homogeneous time-reversal system, a rate backoff factor $D_{i,j}$ 424 is introduced to adjust the symbol rate, i.e., the symbol rate for the $j^{th}$ terminal device of type i is $(B_i/D_{i,j})$. Then, the signature $g_{i,j}$ 426 is embedded into the terminal device-specific data stream $X_{i,j}^{[D_{i,j}]}$ and the signature embedded symbols of the same type i are merged together (e.g., using an adder 428) as $S_i$, e.g., $$S_i = \sum_{j=1}^{M_i}(X_{i,j}^{[D_{i,j}]} * g_{i,j}). \quad (15)$$

Later, the merged symbols $S_i$ go through the type-specific digital signal processing, i.e., upsampled with factor $\alpha B_{AP}/B_i$ using an upsampling unit 430, filtered by a root-raisedcosine filter $RRC_{B_i,\alpha B_{AP}}$ 432 and carried to the type-specific digital frequency with frequency shift $\exp(-j\omega_i n)$ using a frequency shifter 434. The processed data streams of N types are mixed together (e.g., using an adder 436) to generate a composite downlink signal 452. The composite downlink signal 452 passes through one set of RF components 438 at the access point 440, and is broadcasted to all the heterogeneous terminal devices.

Regarding the receiver (i.e., terminal device) side, here we use the $j^{th}$ terminal device of type i as an example. The broadcast signal propagates to the terminal device through a multipath channel 444 having a profile $h_{i,j}(t)$. Because of the spatial-temporal focusing effect, the downlink signal that has been processed with the signature waveform $g_{i,Mi}$ converges at the Mi-th terminal device of type i. The composite downlink signal broadcast from the access point 440 travels through different multipaths to reach different terminal devices 442. After the downlink signal is received at the terminal device, the signal passes through an analog bandpass filter 446 having a center frequency at $f_{c_i}$ and a bandwidth $B_i$. Note that the filtered signal includes not only the intended signal but also interferences, e.g., inter-user inference (IUI) from other terminal devices within the same type and the inter-type-interference (ITI) from other terminal devices of the other types (whose spectrum overlaps with type i). Because of the spatial-temporal focusing effect, the interferences are suppressed due to the unique multipath profile. Afterwards, the signal is carried to baseband and sampled with a sample rate $f_s = \alpha B_i$ (e.g., using an analog-to-digital converter 448), which is much smaller than that at the access point for the low-end terminal devices. The sampled signal goes through a raised-root-cosine filter $RRC_{B_i,\alpha B_i}$ 450 and the rate matching decimator to generate symbols $\{Y_{i,j}[k]\}$, from which $\{X_{i,j}[k]\}$ can be determined.

Figure 10:
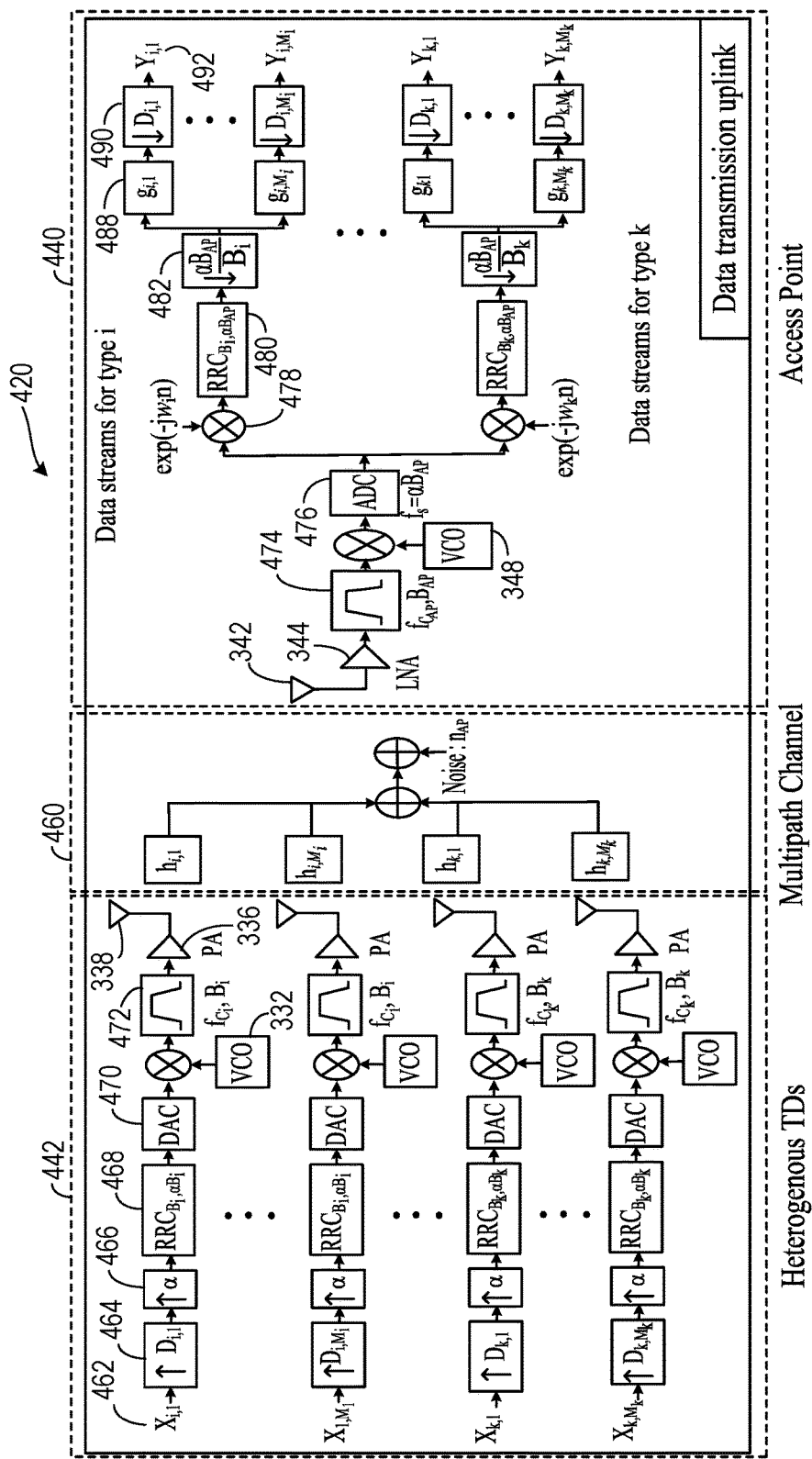
FIG. 10 is a diagram of an exemplary time-reversal division multiple access uplink system with heterogeneous devices.

FIG. 10 is a diagram of the system architecture for uplink transmission of data from the terminal devices 442 to the access point 440 of the heterogeneous system 420. The figure shows that the heterogeneous time-reversal system 420 has an asymmetric architecture. As will be described in more detail below, the access point 440 handles more complicated signal and data processing, while the data processing at the terminal devices 442 is simpler. This allows lower-cost data processors to be used at the terminal devices.

The following describes the processing of uplink signals that is performed at the terminal devices 442. Let $X_{i,j}$ 462 be the information symbols transmitted to the $j^{th}$ terminal device of type i. A rate backoff factor $D_{i,j}$ 464 is introduced to adjust the symbol rate, and the signal is upsampled by $\alpha$ using an upsampling unit 466. The upsampled signal is filtered by a root-raised-cosine filter $RRC_{B_i,\alpha B_i}$ 468, in which $B_1$ is the frequency bandwidth used by the terminal device. The filtered signal is converted to an analog baseband signal using a digital-to-analog converter 470. The baseband signal is modulated to a high carrier frequency by a voltage-controlled oscillator 332, and put through a bandpass filter 472 having a center frequency $f_{ci}$ and a bandwidth $B_i$. The filtered signal is amplified by a power amplifier 336 to produce a radio frequency (RF) signal. The RF signal is broadcasted by an antenna 338.

The signal from the $j^{th}$ terminal device of type i passes a multipath channel having a profile $h_{i,j}$. Noise is added to the uplink signal as the uplink signal passes the multipath channel. The uplink signals from all of the terminal devices 442, after passing the respective multipath channels, are received at the antenna 342 of the access point 440. The signal received by the antenna 342 is an aggregate of the uplink signals transmitted from the terminal devices through the various multipath channels, and is referred to as a composite uplink signal.

The following describes the processing of the composite uplink signal that is performed at the access point 440. Similar to the homogeneous time-reversal system, in the heterogeneous time-reversal system 420, the precoding signatures $g_{i,j}$'s in the downlink can serve as the equalizers in the uplink. After converting the signal into digital domain through a single set of RF components at the access point 440, multiple parallel digital processing (e.g., frequency shift, root-raised-cosine filtering, and rate conversion) are performed to support N types of terminal devices 442 simultaneously.

In some implementations, the composite uplink signal received at the antenna 342 is amplified by a low-noise amplifier 344, and filtered by a bandpass filter 474 having a center frequency $f_{cAP}$ and a bandwidth $B_{AP}$. The pass band of the bandpass filter 474 spans a frequency range that encompasses the pass bands of the bandpass filters 472 of the terminal devices 442. The filtered signal is converted to the analog baseband signal using a VCO 348. The baseband signal is sampled by an analog-to-digital converter (ADC) 476 with a sample rate $f_s = \alpha B_{AP}$ to produce a digital signal 484.

In some implementations, the digital signal 484 is divided into N parallel data streams for the N types of terminal devices. For example, one of the data stream is associated with the i-th type of device, and the digital signal 484 is carried to the type-specific digital frequency with frequency shift $\exp(j\omega_i n)$ using a frequency shifter 478. The digital signal is then filtered by a raised-root-cosine filter $RRC_{B_i,\alpha B_{AP}}$ 480 and downsampled by a factor $\alpha B_{AP}/B_i$ using a downsampling unit 482 to produce a digital signal 486.

In some implementations, the digital signal 486 is divided into $M_1$ parallel data streams that are associated with the $M_i$ terminal devices of type i. For example, one of the data streams is associated with the j-th terminal device of type i. The signature waveform $g_{i,j}$ used to process the downlink signal for the j-th terminal device of type i can also serve as the equalizer for processing the uplink signal from the j-th terminal device of type i. In this example, the signature waveform $g_{i,j}$ 488 is applied to the digital signal 486, and the resulting signal is downsampled by a factor of $D_{i,j}$ using a downsampling unit 490 to produce a downsampled signal $Y_{i,j}$ 492, which can be used to estimate the transmitted information symbols $X_{i,j}$ 462.

The access point 440 may include detection modules that perform interference cancellation and detection that cancels the inter-symbol interference and the inter-user interference to determine the user uplink data $X_{ij}$. For example, an inter-symbol interference and inter-user interference cancellation technique is described in U.S. application Ser. No. 13/969,320, titled "Multiuser Time-Reversal Division Multiple Access Uplink system With Parallel Interference Cancellation," filed on Aug. 6, 2013, the contents of which are incorporated by reference in their entirety.

Compared with the homogeneous time-reversal system, the heterogeneous time-reversal system 420 maintains the capability to support different QoS through not only varying the backoff factor $D_{i,j}$ but also providing the flexibility for terminal devices to select various bandwidths ($B_i$'s). More importantly, the heterogeneous time-reversal system architecture further promotes the benefit of the asymmetric complexity. In the heterogeneous time-reversal system 420, the complexity is even more concentrated at the access point side, as compared to that of the homogeneous time-reversal system. In some implementations, regarding the access point, a single set of RF components is used. Even though more complicated parallel digital signal processing is needed at the access point, it can be satisfied with more powerful digital signal processing (DSP) unit at an affordable cost and complexity. Regarding the heterogeneous terminal devices, the ADC sample rate is reduced significantly for those devices with smaller bandwidths, which lowers the cost of hardware significantly for the low-end terminal devices. In addition, the lower sample rate decreases the computational burden.

In some implementations, the transmitted waveforms can be designed based on given design criteria such as system performance, quality of service constraints, or fairness among users. The amplitude and phase of each tap of the waveform can be adjusted based on the channel information, such that after convolving with the channel, the received signal at the receiver retains most of the intended signal strength and rejects or suppresses the interference as much as possible. Techniques for waveform design are described in U.S. patent application Ser. No. 13/706,342, titled "Waveform Design for Time-Reversal Systems," filed on Dec. 5, 2012, the contents of which are incorporated by reference in their entirety.

Performance Analysis of a Heterogeneous Time-Reversal System

The heterogeneous time-reversal system is analyzed under the general scenario, where N types of terminal devices are supported in the system and the number of type i terminal device is $M_i$. The spectrum usage of the different types of devices is shown in FIG. 7.

Let $\{X_{i,j}[k]\}$ denote the information symbols for the $j^{th}$ terminal device in type i, and $D_{i,j}$ and $g_{i,j}$ are the backoff factor and the embedded signature for the symbols $\{X_{i,j}[k]\}$, respectively. The terminal devices in type i suffer from inter-type-interference from type k terminal devices, where $k \in T_i$ and $T_i$ denotes the set of types of devices whose spectrum is overlapped with type i devices. In other words, the data streams of type k devices, where $k \notin T_i$, cause no interference to type i terminal devices.

Regarding the channel impulse response, we denote $\bar{h}_{i,j}$ as the discrete channel impulse response from the access point to the $j^{th}$ terminal device in type i with sample rate $f_s = \alpha B_{AP}$. Let $\hat{h}_{i_m,k_n}$ be the equivalent channel impulse response for the data stream of the $m^{th}$ terminal device in type i between the access point to the $n^{th}$ terminal device in type k. Similar to equation (13), the equivalent channel impulse response for data streams can be derived as $$\hat{h}_{i_m,k_n} = \begin{cases} \sqrt{\beta_i} \, (RRC_{B_i,\alpha B_{AP}} * \bar{h}_{i,n} * RRC_{B_i,\alpha B_{AP}})_{[\alpha\beta_i]}, & i = k, \\ (RRC_{B_i,\alpha B_{AP}} * \bar{h}_{k,n} * RRC_{B_k,\alpha B_k}^{[\beta_k]})_{[\alpha]}, & i \neq k, \end{cases} \quad (16)$$

where $\beta_i = B_{AP}/B_i$. From equation (16), the length of the equivalent channel impulse response solely depends on the types of data stream and the receiving terminal device. Once the channel impulse responses are estimated, various signature design methods can be deployed. For example, the basic time-reversal signature of the $j^{th}$ terminal device of a type i device can be written as:

$$g_{i,j}[n] = \frac{\hat{h}_{i_j,i_j}^*[L-1-n]}{\|\hat{h}_{i_j,i_j}\|}. \quad (17)$$

Thus, the received symbols at the $j^{th}$ terminal device $Y_{i,j}$ of type i can be expressed as $$Y_{i,j}[n] = \frac{\sqrt{p_u}}{\beta_i}(g_{i,j} * \hat{h}_{i_j,i_j})[L_i - 1]X_{i,j}\left[n - \frac{L_i - 1}{D_{i,j}}\right] + \quad (18)$$

$$\frac{\sqrt{p_u}}{\beta_i} \sum_{l=0, l \neq (L_i-1)/D_{i,j}}^{(2L_i-2)/D_{i,j}} (g_{i,j} * \hat{h}_{i_j,i_j})[D_{i,j}l]X_{i,j}[n-l] +$$

$$\frac{\sqrt{p_u}}{\beta_i} \sum_{m=1, m \neq j}^{M_i} \sum_{l=(L_i-1)/D_{i,m}}^{(2L_i-2)/D_{i,m}} (g_{i,m} * \hat{h}_{i_m,i_j})[D_{i,m}l]X_{i,m}[n-l] +$$

$$\sqrt{p_u} \sum_{k \in T_i} \sum_{m=1}^{M_k} \sum_{l=0}^{\frac{L_{k,i}-1}{\beta_k D_{k,m}}} (g_{k,m}^{[\beta_k]} * \hat{h}_{k_m,i_j})[\beta_k D_{k,m}l]X_{k,m}[n-l] + n_{i,j}[n],$$

where $L_i = \text{length}(\hat{h}_{i_*,i_*})$, $$\beta_i = B_{AP}/B_i \text{ and } L_{k,i} = \text{length}(g_{k,*}^{[\beta_k]} * \hat{h}_{k_*,i_*}).$$

In equation (18), the first term is the intended signal, the second and third terms represent the inter-symbol interference (ISI) and the inter-user interference within the same type, and the inter-type-interference from overlapped types ($k \in T_i$) is expressed as the fourth term. Based on equation (18), the SINR for the $j^{th}$ terminal device in type i within the general heterogeneous time-reversal system can be calculated correspondingly similar to equation (11).

Time Division Multiple Access and Spectrum Allocation

We first consider three devices in the heterogeneous time-reversal system, whose features are listed in Table 1. According to the table, the bit rates of the high-definition (HD) video and the high-definition audio are around 18 Mbits/s and 4 Mbits/s. The bandwidth of the access point is assumed to be 150 MHz to support simultaneous data transmission to these 3 devices.

TABLE 1

| Device Name | Bandwidth (MHz) | Backoff Factor | Modulation | Coding Rate | Waveform Design |
|---|---|---|---|---|---|
| HD Video 1 | 150 | 8 | QPSK | ½ | Basic TR |
| HD Audio 1 | 50 | 12 | QPSK | ½ | Basic TR |
| HD Audio 2 | 50 | 12 | QPSK | ½ | Basic TR |

Figure 11:
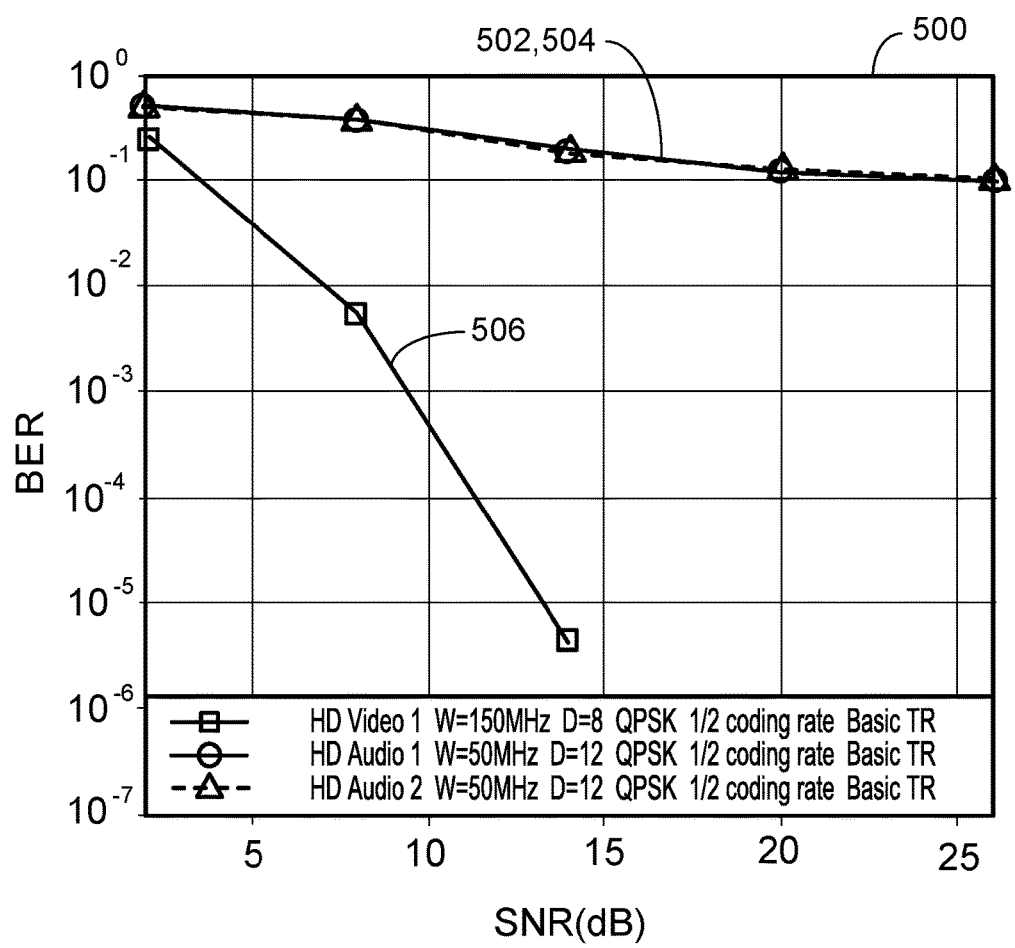
FIG. 11 is a graph showing the bit-error-rate performance of three devices in an exemplary heterogeneous time-reversal system.

We first consider the case that three devices are categorized into two types, where Type 1 includes the high-definition video device and Type 2 includes two high-definition audio devices. Referring to FIG. 11, a graph 500 shows the bit error rate (BER) performance of three devices under such a scenario. It can be inferred from the figure that the bit error rate performance of the two high-definition audio devices (represented by curves 502 and 504, which in this example overlap each other) is much worse compared with the bit error rate of high-definition video (represented by curve 506). The reason for this result is that the suppression of inter-user interference in the time-reversal system heavily depends on the number of resolved independent multipaths, which increases with the bandwidth. Since the bandwidth of two high-definition audio is much narrower, the inter-user interference from the other devices becomes more severe with the basic time-reversal signature. In order to tackle the inter-user interference for the devices with a narrower bandwidth, along with the time-reversal technology, other techniques can also be used in the heterogeneous time-reversal system.

Figure 12A:
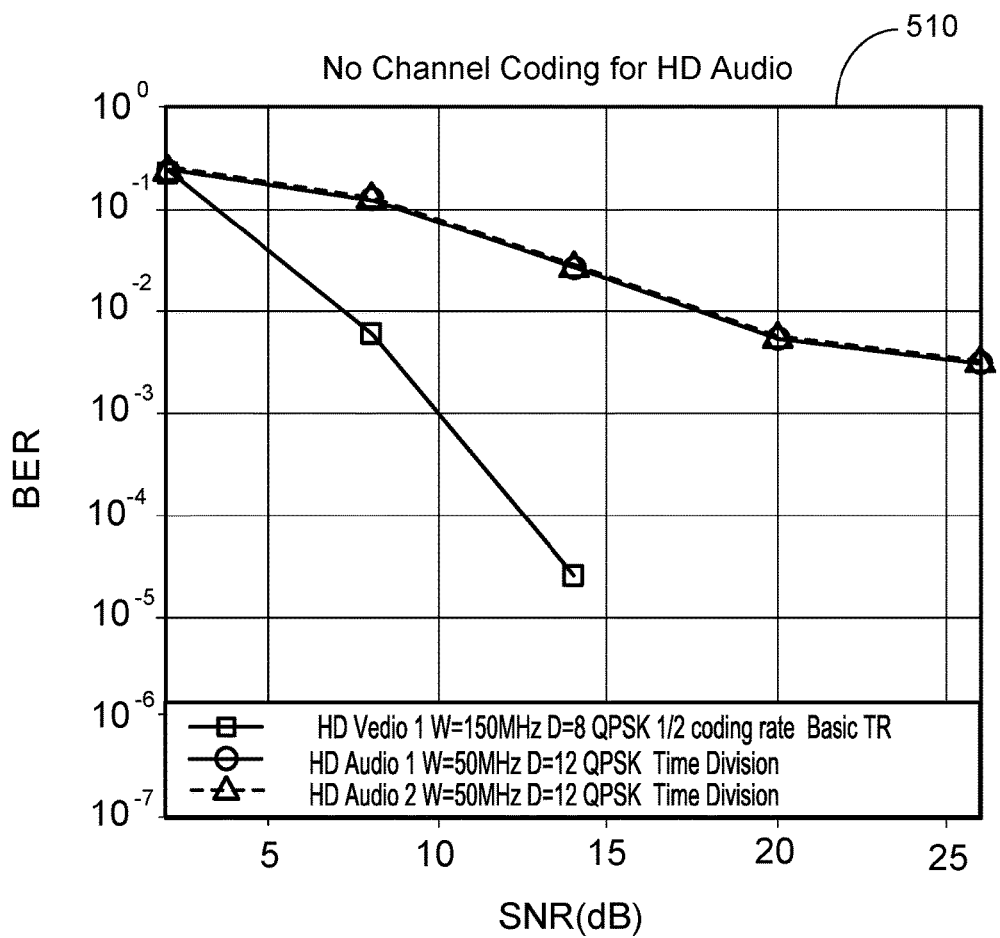
FIG. 12A is a graph showing the improved bit-error-rate with Time Division Multiple Access in the heterogeneous time-reversal system with no channel coding for high-definition audio device.
Figure 12B:
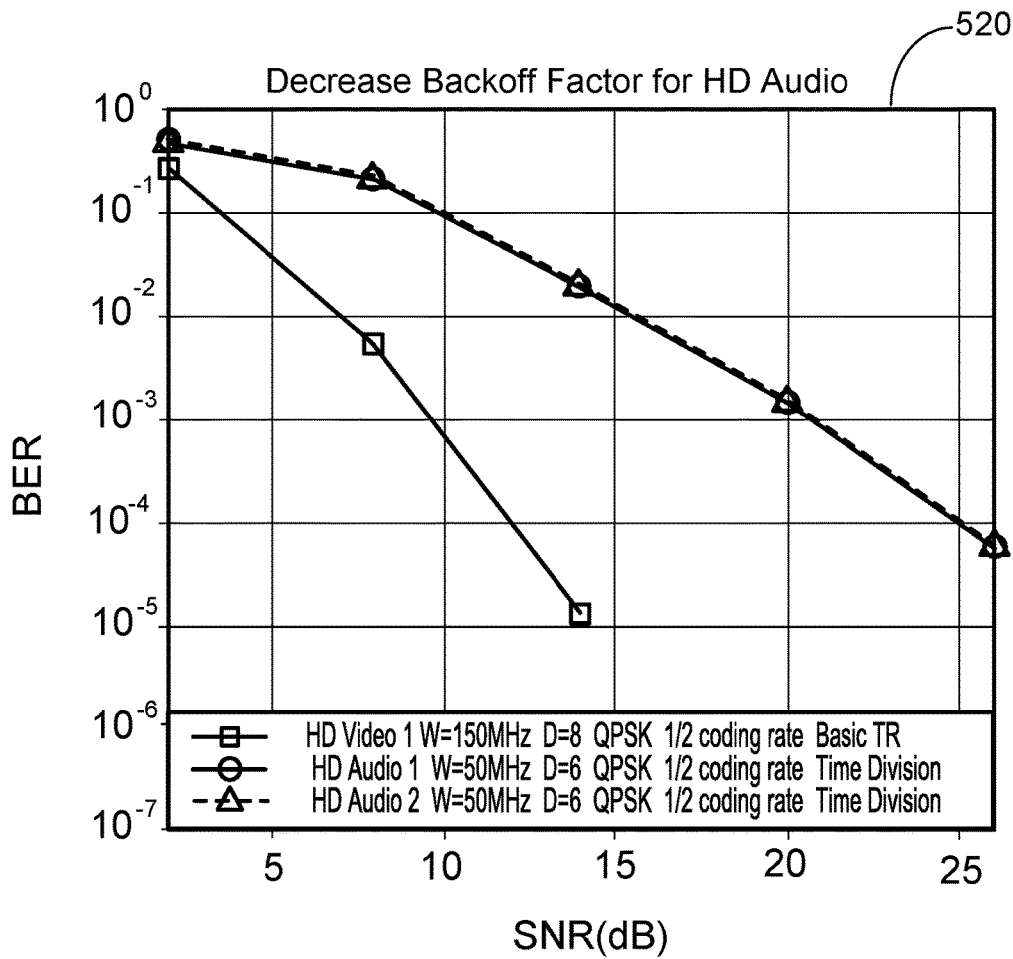
FIG. 12B is a graph showing the improved bit-error-rate with Time Division Multiple Access in the heterogeneous time-reversal system with smaller rate backoff for high-definition audio device.

We first consider applying time division multiple access (TDMA) to the heterogeneous time-reversal system. In this example, the access point supports one high-definition audio at a time. To maintain the same QoS requirement in terms of bit rate, either adjusting the coding rate or decreasing the backoff factor is adopted in the system. Referring to FIGS. 12A and 12B, graphs 510 and 520 show the improved bit error rate performance of three devices with TDMA. In FIG. 12A, the graph 510 show results in which the channel coding is removed. In FIG. 12B, the graph 520 shows the results in which the backoff rate is decreased to maintain the same bit rate for the high-definition audio. Compared with the bit error rate in FIG. 11, the bit error rate performance shown in FIGS. 12A and 12B is improved significantly with the TDMA. Moreover, a comparison of graphs 510 and 520 indicate that decreasing the backoff factor to maintain the bit rate is a better strategy for the devices with narrow bandwidths. In some implementations, additional waveform design techniques can be implemented in the heterogeneous time-reversal system to achieve even better performance.

Figure 13:
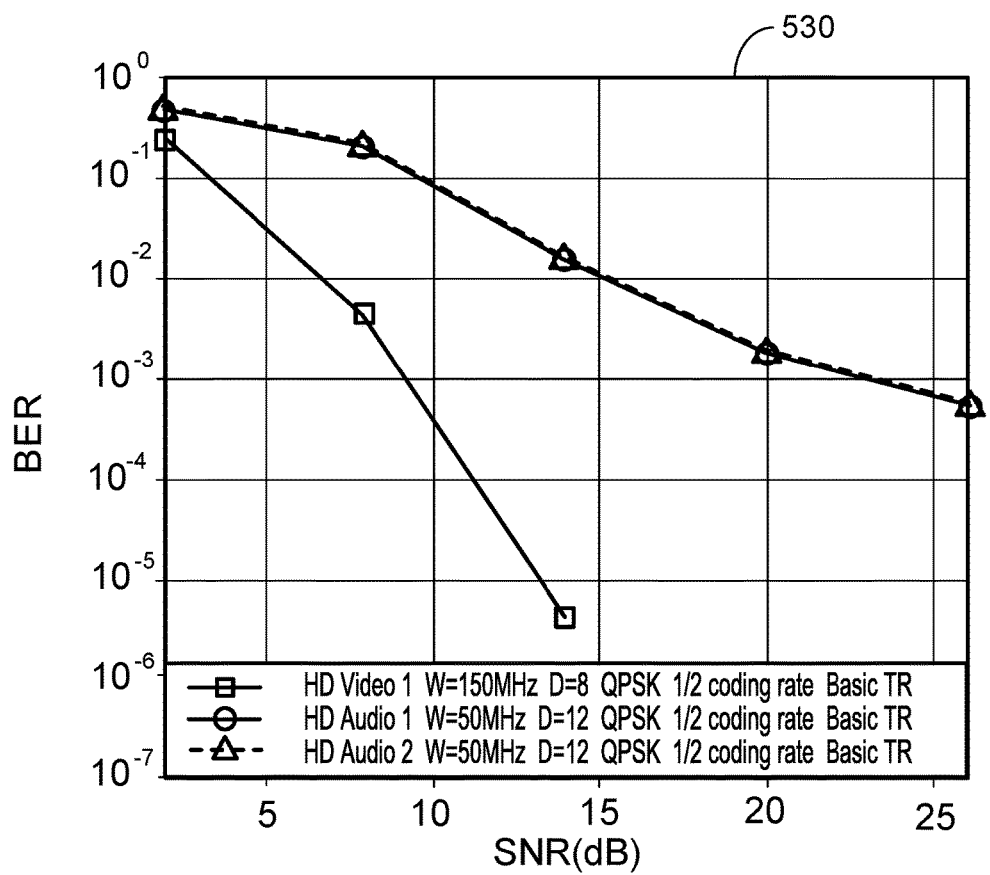
FIG. 13 is a graph showing the improved bit-error-rate with Spectrum Allocation in the heterogeneous time-reversal system.

Even though a narrow bandwidth decreases the number of resolved independent multipaths thus resulting in severer inter-user interference, a narrow bandwidth on the other hand provides more flexibility for spectrum allocation. Therefore, another way to improve the bit error rate performance in the example of FIG. 11 is to arrange the spectrum allocation smartly to remove unnecessary interference. For example, the three devices in Table 1 can be categorized into three distinct types, where two high-definition audio devices are allocated into two spectrally non-overlapped types. Referring to FIG. 13, a graph 530 shows the improved bit error rate performance with the spectrum allocation described above.

Heterogeneous Time-Reversal System Case Study: Smart Homes

Figure 14:
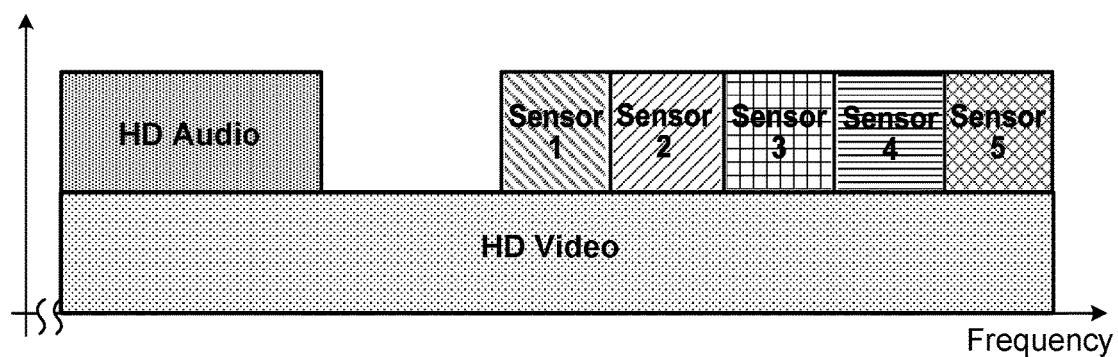
FIG. 14 is a graph showing the spectrum allocation of an exemplary Smart Home application.
Figure 15:
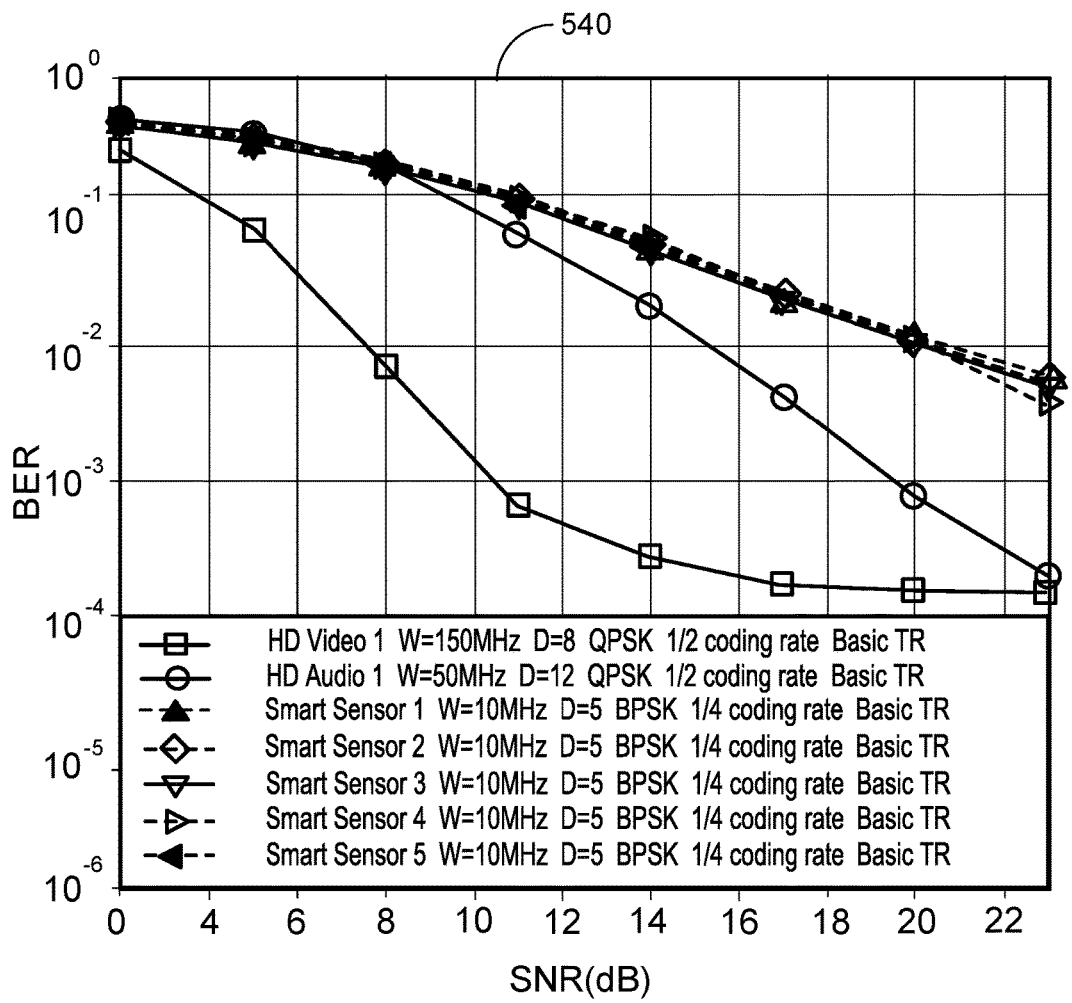
FIG. 15 is a graph showing the bit-error-rate of devices in Smart Homes application using heterogeneous time-reversal communication.

We choose Smart Homes as an example of the Internet of Things application to test the bit error rate performance with the heterogeneous time-reversal paradigm. Instrumenting buildings with the Internet of Things technologies will help in not only reducing resources (electricity, water) consumption but also in improving the satisfaction level of humans. Typically, the high-definition video and high-definition audio are employed in the Smart Homes for both the security monitoring and entertainment. Moreover, smart sensors are used in the Smart Homes to both monitor resource consumptions as well as to proactively detect the users' need. Therefore, in the following simulation, we assume one high-definition video, one high-definition audio and five smart sensors in the Smart Homes are supported by the heterogeneous time-reversal paradigm. The specific features of these devices are listed in Table 2, the spectrum allocation is shown in FIG. 14, and the corresponding bit error rate performance is shown in a graph 540 in FIG. 15. The results show good bit error rate performance for all types of devices. Note the saturation of the bit error rate for the high-definition video is due to the dominant inter-user interference with the basic time-reversal signature. In addition, the slight difference in the bit error rate for the smart sensors comes from the frequency-selectivity of the channel.

TABLE 2

| Device Name | Bandwidth (MHz) | Backoff Factor | Modulation | Coding Rate | Waveform Design |
|---|---|---|---|---|---|
| HD Video 1 | 150 | 8 | QPSK | ½ | Basic TR |
| HD Audio 1 | 50 | 12 | QPSK | ½ | Basic TR |
| Smart Sensor 1 | 10 | 10 | QPSK | ½ | Basic TR |
| Smart Sensor 2 | 10 | 10 | QPSK | ½ | Basic TR |
| Smart Sensor 3 | 10 | 10 | QPSK | ½ | Basic TR |
| Smart Sensor 4 | 10 | 10 | QPSK | ½ | Basic TR |
| Smart Sensor 5 | 10 | 10 | QPSK | ½ | Basic TR |

In some implementations, the access point 302, 320, 406, or 440 can be part of a mobile or stationary device. For example, the access point can be implemented as part of a sensor module, a controller, a mobile phone, a laptop computer, a desktop computer, a modem, a router, or an electronic appliance that communicates wirelessly with multiple other devices. For example, a mobile phone or a laptop computer may communicate simultaneously with the smart sensors 304, the smart home appliances 306, the healthcare devices 308, the entertainment devices 310, the security devices 312, printers, thermometers, lighting control systems, and other devices using the techniques described above.

The access point can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java, Perl, Python), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Other embodiments are within the scope of the following claims. For example, the devices that communicate with the base station can be different from those shown in FIG. 3, and can include many more objects. In the time-reversal wireless communication system, a transmitter and a receiver need to obtain information about the overall system, e.g., information about the communication channel and information about time synchronization. In some implementations, such information is obtained in a channel probing (CP) phase and a data transmission (DT) phase of a time-reversal communication system. In the channel probing phase, the transmitter acquires channel information to realize the focusing effects, while in the data transmission phase, the receiver acquires timing information to synchronize and sample relevant signals. The process of obtaining channel information in the channel probing phase and obtaining synchronization in the data transmission phase is referred to as time-reversal handshaking. Techniques for time-reversal handshaking is described in U.S. Pat. No. 9,313,020, titled "Handshaking Protocol For Time-Reversal System," the contents of which are incorporated by reference in their entirety.

What is claimed is:

1. A system comprising:
    a base device wirelessly coupled with a set of heterogeneous devices each with heterogeneous bandwidth, heterogeneous center frequency and heterogeneous data rate, the base device comprising:
        a first frequency shifter to shift a frequency of a first downlink signal with a first heterogeneous bandwidth W1 to produce a first frequency-shifted downlink signal having a first heterogeneous center frequency F1,
            wherein the first downlink signal to contain a first information at a first heterogeneous data rate associated with a first heterogeneous device in the set of heterogeneous devices;
        a second frequency shifter to shift a frequency of a second downlink signal with a second heterogeneous bandwidth W2 to produce a second frequency-shifted downlink signal having a second heterogeneous center frequency F2,
            wherein the second downlink signal to contain a second information at a second heterogeneous data rate associated with a second heterogeneous device in the set of heterogeneous devices;
        an adder to combine the first and second frequency-shifted downlink signals to produce a combined downlink signal; and
        a radio frequency (RF) module to convert the combined downlink signal to a combined RF signal that comprises the first information at the first heterogeneous data rate of the first downlink signal and the second information at the second heterogeneous data rate of the second downlink signal,
            wherein passband of the combined RF signal has a bandwidth W0 not smaller than both W1 and W2 such that the passband to encompass a first passband of the first heterogeneous bandwidth W1 associated with the first heterogeneous device and a second passband of the second heterogeneous bandwidth W2 associated with the second heterogeneous device.

2. The system of claim 1 in which the base device further comprises a digital-to-analog converter to convert a combined digital downlink signal to a combined analog downlink signal that is processed by the RF module to generate the combined RF signal,
    wherein the first downlink signal is digital,
    wherein the second downlink signal is digital,
    wherein the combined downlink signal is digital, and
    wherein the first frequency shifter, the second frequency shifter, and the adder are implemented by a data processor with a memory configured to:
        shift the frequency of the first downlink signal to produce the first frequency-shifted downlink signal,
        shift the frequency of the second downlink signal to produce the second frequency-shifted downlink signal, and
        combine the first and second frequency-shifted downlink signals to produce the combined downlink signal.

3. The system of claim 1, comprising:
    a first heterogeneous filter having a first filter bandwidth matching the first heterogeneous bandwidth W1 associated with the first heterogeneous device to filter the first downlink signal, and
    a second heterogeneous filter having a second filter bandwidth matching the second heterogeneous bandwidth W2 associated with the second heterogeneous device to filter the second downlink signal,
in which the first downlink signal is intended for the first heterogeneous device, and the second downlink signal is intended for the second heterogeneous device.

4. The system of claim 3, in which the first filter comprises a root-raised-cosine filter.

5. The system of claim 1 in which the base device further comprises an upsampling unit that is configured to upsample a version of the first downlink signal by a multiple that is determined based on a the passband bandwidth W0 associated with the base device and the first heterogeneous bandwidth W1 associated with the first device.

6. The system of claim 5, in which the upsampling unit is configured to upsample the version of the first downlink signal by a multiple that is proportional to the passband bandwidth W0 associated with the base device and inversely proportional to the first heterogeneous bandwidth W1 associated with the first heterogeneous device.

7. The system of claim 1, in which the base device is configured to:
generate the first downlink signal based on a first heterogeneous location-specific signature waveform for the first heterogeneous device, the first heterogeneous location-specific signature waveform being associated with a first location of the first heterogeneous device, and
generate the second downlink signal based on a second heterogeneous location-specific signature waveform for the second heterogeneous device, the second heterogeneous location-specific signature waveform being associated with a second location of the second heterogeneous device.

8. The system of claim 7, in which the base device is configured to:
receive a first probe signal from the first heterogeneous device and a second probe signal from the second heterogeneous device,
determine the first location-specific signature waveform for the first heterogeneous device based on a first time-reversed waveform of a first channel response signal derived from the first probe signal, and
determine the second location-specific signature waveform for the second heterogeneous device based on a second time-reversed waveform of a second channel response signal derived from the second probe signal.

9. The system of claim 1, in which:
the first heterogeneous center frequency F1 is equal to a first difference between a carrier frequency of the combined RF signal and a first carrier frequency associated with the first heterogeneous device, and
the second heterogeneous center frequency F2 is equal to a second difference between the carrier frequency of the combined RF signal and a second carrier frequency associated with the second heterogeneous device.

10. A system comprising:
a base device comprising:
a data processor communicatively coupled with a memory configured to generate a composite downlink signal that includes heterogeneous signal components derived from heterogeneous data signals at heterogeneous data rates intended to be transmitted to heterogeneous devices having heterogeneous frequency spectrum requirements and heterogeneous data rate requirements, in which the process of generating the composite downlink signal includes:
embedding heterogeneous location-specific signature waveforms in the heterogeneous signal components to enable different portions of a signal transmitted by the base device to converge at different heterogeneous devices at different locations that are intended to receive the respective portions, the heterogeneous location-specific signature waveforms each being associated with a respective location of a respective one of the heterogeneous devices,
modifying a spectral distribution of the heterogeneous signal components based on information about a frequency spectrum associated with the base device and information about frequency spectrums associated with the heterogeneous devices, and
combining the heterogeneous signal components to generate the composite downlink signal.

11. The system of claim 10, in which the base device comprises:
a radio frequency module configured to:
generate a radio frequency downlink signal based on the composite downlink signal, in which the radio frequency downlink signal has heterogeneous signal components intended for the heterogeneous devices, and the heterogeneous signal components have heterogeneous spectral characteristics that match heterogeneous spectral characteristics of respective heterogeneous devices intended to receive the heterogeneous components.

12. The system of claim 10 in which a radio frequency module is configured to modulate a radio frequency carrier signal with the composite downlink signal to generate the radio frequency downlink signal,
wherein the spectral distributions of the heterogeneous signal components of the composite downlink signal are modified by the data processor such that the heterogeneous signal components of the composite downlink signal intended for particular heterogeneous devices have frequency spectrum distributions that match the spectrum requirements of the respective heterogeneous devices.

13. The system of claim 12 in which the data processor is configured to generate the composite downlink signal with a passband bandwidth of W0 that comprises a first heterogeneous signal component with a first heterogeneous bandwidth W1 derived from a first heterogeneous data signal with a first heterogeneous data rate intended to be transmitted to a first heterogeneous device that operates at a first heterogeneous frequency spectrum, and a second heterogeneous signal component with a second heterogeneous bandwidth W2 derived from a second heterogeneous data signal with a second heterogeneous data rate intended to be transmitted to a second heterogeneous device that operates at a second heterogeneous frequency spectrum, wherein W0 is not smaller than both W1 and W2, in which the process of generating the composite downlink signal comprises:
embedding a first location-specific signature waveform in the first heterogeneous signal component to enable a first portion of a downlink signal transmitted by the base device to converge at the first heterogeneous device,
embedding a second location-specific signature waveform in the second heterogeneous signal component to enable a second portion of the downlink signal transmitted by the base device to converge at the second heterogeneous device,
modifying a first spectral distribution of the first heterogeneous signal component based on information about a first frequency spectrum associated with the first heterogeneous device and information about a third frequency spectrum associated with the base device, and modifying a second spectral distribution of the second heterogeneous signal component based on information about a second frequency spectrum associated with the second heterogeneous device and information about the third frequency spectrum.

14. The system of claim 13 in which the radio frequency downlink signal has a first component intended for the first device and a second component intended for the second device, the first component has a spectral distribution that matches a spectrum requirement of the first device, and the second component has a spectral distribution that matches a spectrum requirement of the second device.

15. A system comprising:

a base device wirelessly coupled with a set of heterogeneous devices each with heterogeneous bandwidth, heterogeneous center frequency and heterogeneous data rate, the base device comprising:

a data processor communicatively coupled with a memory configured to:

receive a composite uplink signal with passband bandwidth W0 that comprises heterogeneous components derived from a first uplink signal with a first heterogeneous bandwidth W1 sent from a first heterogeneous device and a second uplink signal with a second heterogeneous bandwidth W2 sent from a second heterogeneous device, wherein W0 is not smaller than both W1 and W2;

modify a frequency distribution of a processed version of the composite uplink signal by a first amount that is dependent on a first spectral characteristic associated with the first heterogeneous device to generate a first frequency-shifted uplink signal;

estimate first uplink data symbols at a first heterogeneous data rate sent from the first heterogeneous device based on the first frequency-shifted uplink signal and a first heterogeneous location-specific signature waveform that is associated with a first location of the first heterogeneous device;

modify the frequency distribution of the processed version of the composite uplink signal by a second amount that is dependent on a second spectral characteristic associated with the second heterogeneous device to generate a second frequency-shifted uplink signal; and estimate second uplink data symbols at a second heterogeneous data rate sent from the second heterogeneous device based on the second frequency-shifted uplink signal and a second heterogeneous location-specific signature waveform that is associated with a second location of the second heterogeneous device.

16. The system of claim 15 in which the data processor is configured to shift the frequency distribution of the processed version of the composite uplink signal by an amount that is based on a difference between a first carrier frequency associated with the first heterogeneous device and a carrier frequency associated with the base device.

17. The system of claim 15 in which the data processor is configured to filter the first frequency-shifted uplink signal using a first filter having a first filter bandwidth that matches the first heterogeneous bandwidth W1 associated with the first heterogeneous device, and filter the second frequency-shifted uplink signal using a second filter having a second filter bandwidth that matches the second heterogeneous bandwidth W2 associated with the second heterogeneous device.

18. The system of claim 17 in which the first filter comprises a root-raised-cosine filter.

19. The system of claim 15 in which the data processor is configured to:

downsample the first frequency-shifted uplink signal by a first factor that is dependent on the first heterogeneous bandwidth W1 associated with the first heterogeneous device and the passband bandwidth W0 associated with the base device, and downsample the second frequency-shifted uplink signal by a second factor that is dependent on the second heterogeneous bandwidth W2 associated with the second heterogeneous device and the passband bandwidth W0 associated with the base device.

20. The system of claim 15 in which the base device comprises a radio frequency component to receive a radio frequency composite uplink signal, and demodulate the radio frequency composite uplink signal to generate a baseband composite uplink signal that is provided to the data processor.

* * * * *

UNITED STATES PATENT AND TRADEMARK OFFICE
CERTIFICATE OF CORRECTION

| | | |
|---|---|---|
| PATENT NO. | : 9,887,864 B1 | Page 1 of 1 |
| APPLICATION NO. | : 15/268477 | |
| DATED | : February 6, 2018 | |
| INVENTOR(S) | : Yi Han et al. | |

It is certified that error appears in the above-identified patent and that said Letters Patent is hereby corrected as shown below:

In the Claims

Column 27, Line 11, Claim 25, delete "a the" and insert -- the --.

Signed and Sealed this
Fourth Day of December, 2018

Andrei Iancu
*Director of the United States Patent and Trademark Office*